Aug. 31, 1954 G. A. WEINGARTNER 2,687,750
MECHANISM FOR CONTROLLING THE OPERATION
OF THE HEDDLE FRAMES OF LOOMS
Filed Oct. 17, 1952 18 Sheets-Sheet 1

Inventor
Gerald A. Weingartner,
By
John Lowero
Attorney

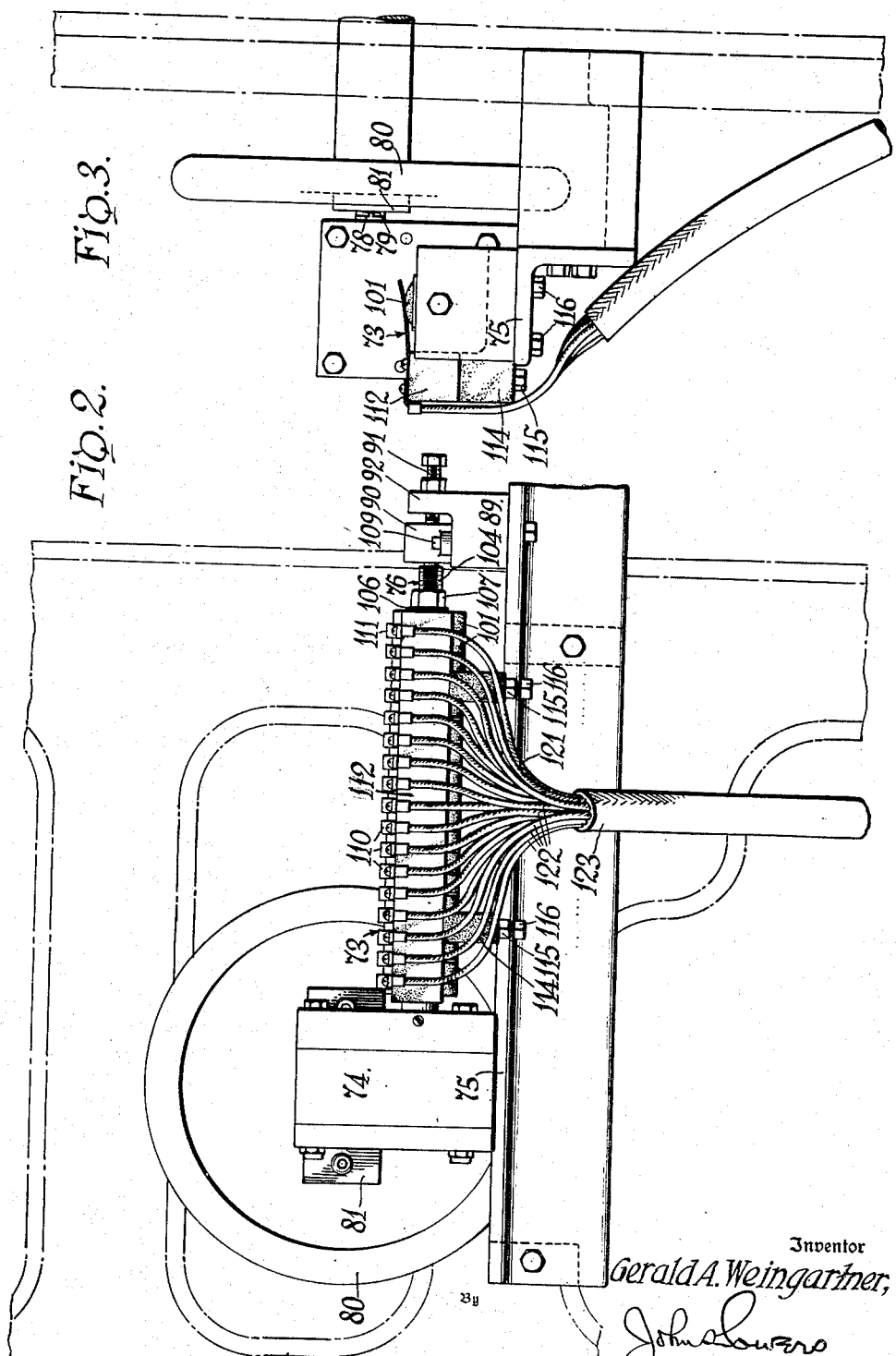

Aug. 31, 1954
G. A. WEINGARTNER
2,687,750
MECHANISM FOR CONTROLLING THE OPERATION
OF THE HEDDLE FRAMES OF LOOMS
Filed Oct. 17, 1952
18 Sheets-Sheet 3
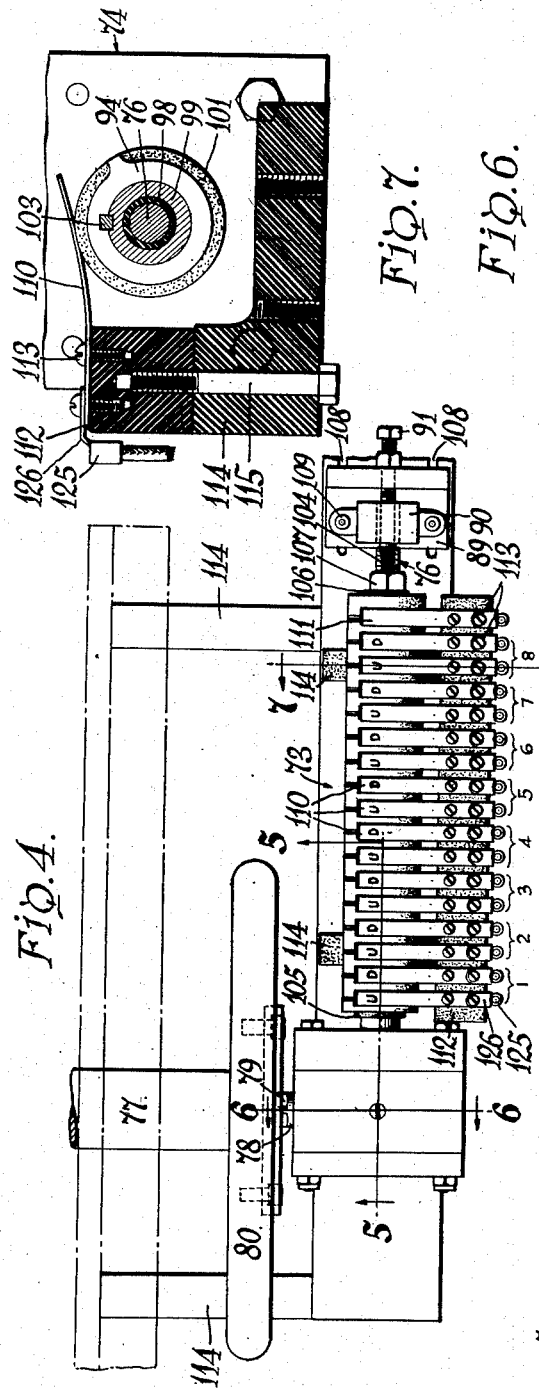
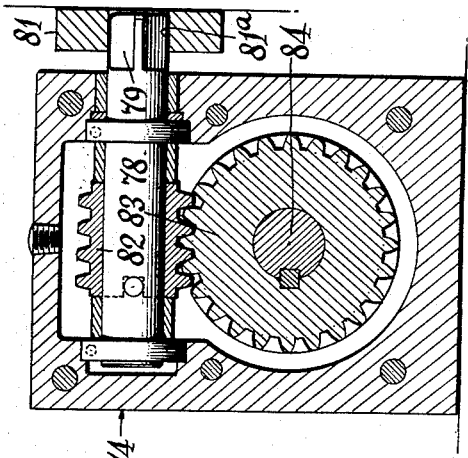
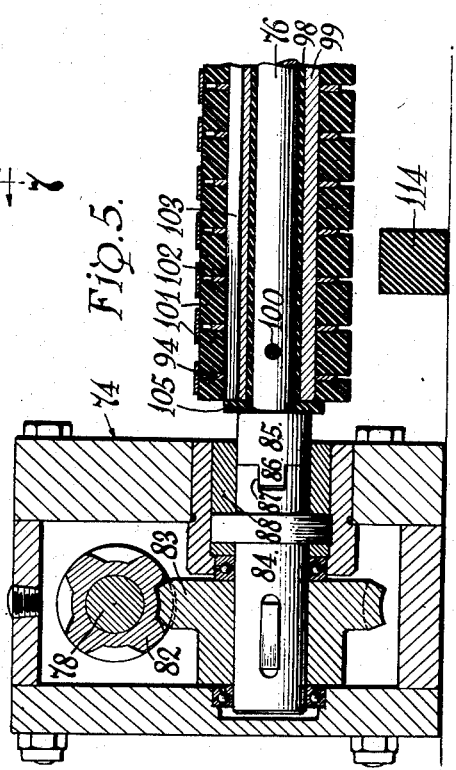
Inventor
Gerald A. Weingartner,
By John Bowers
Attorney

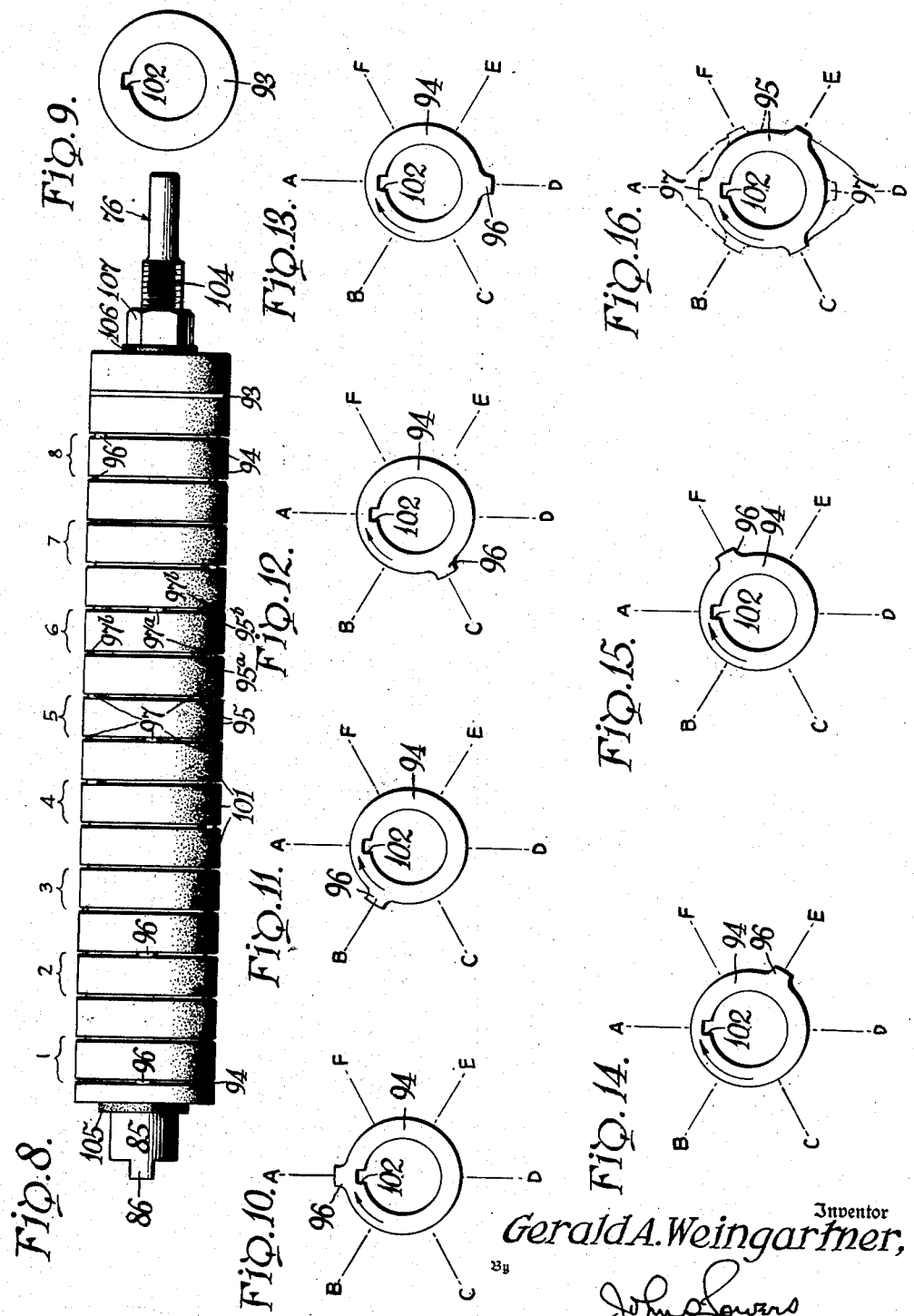

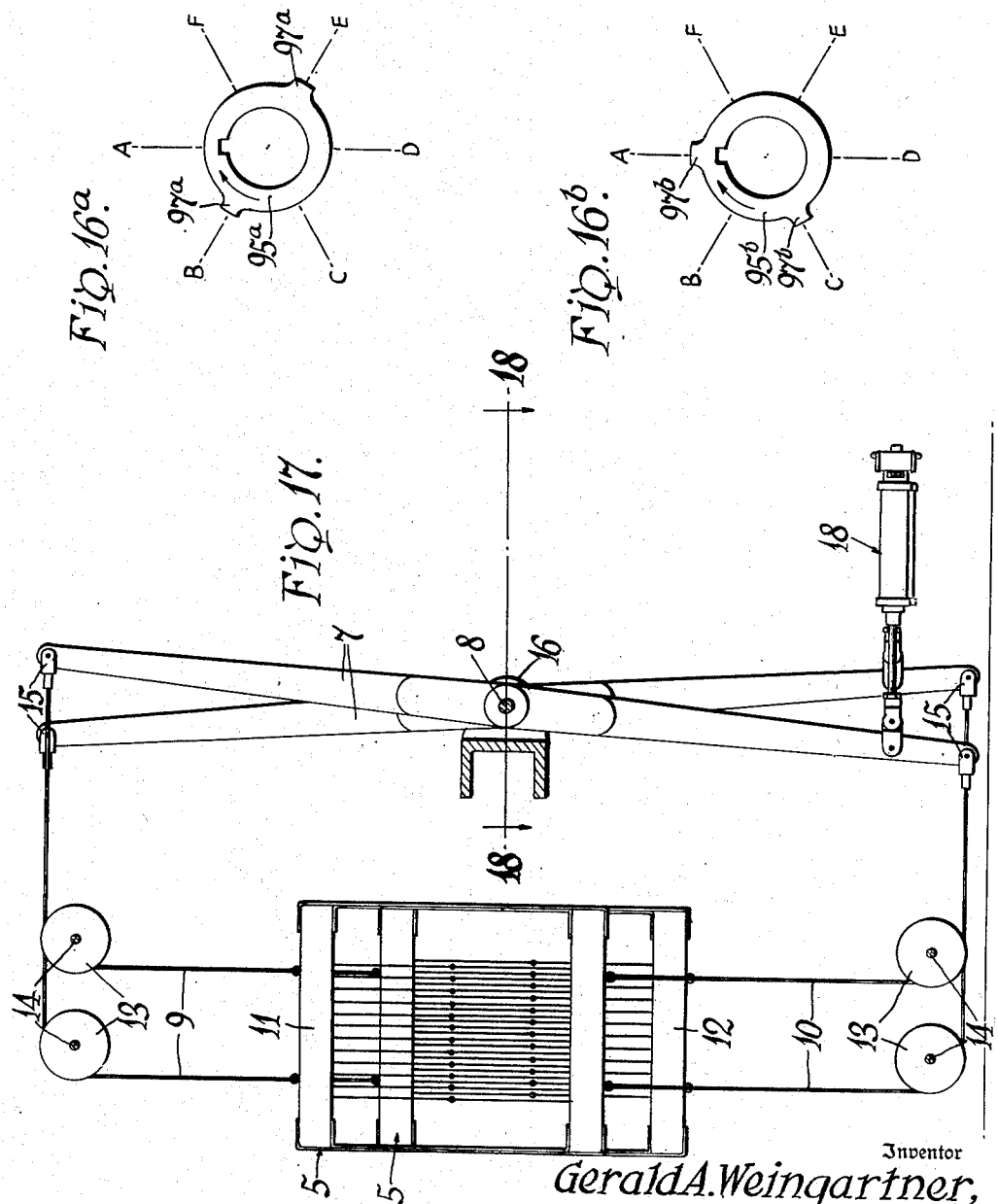

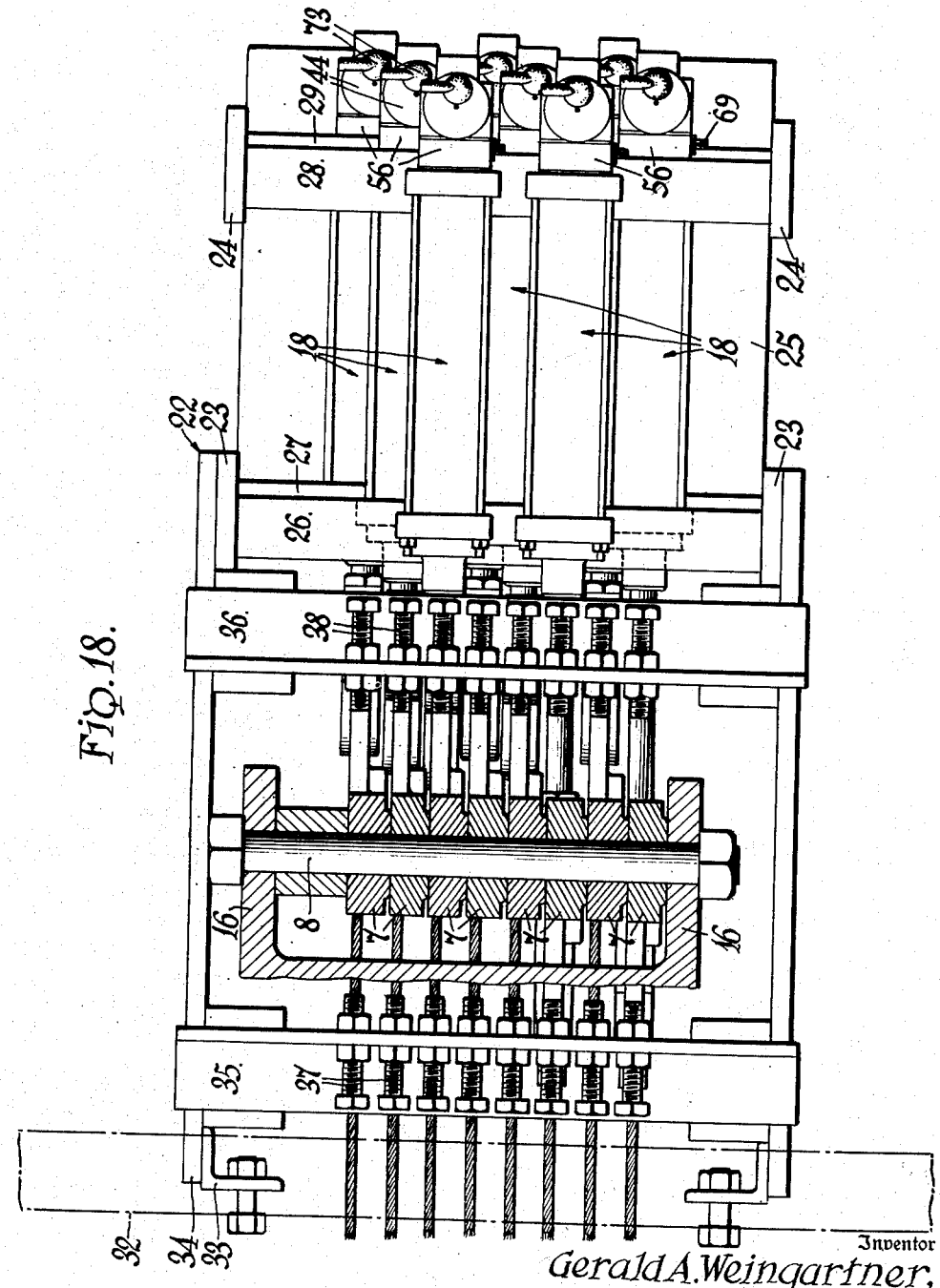

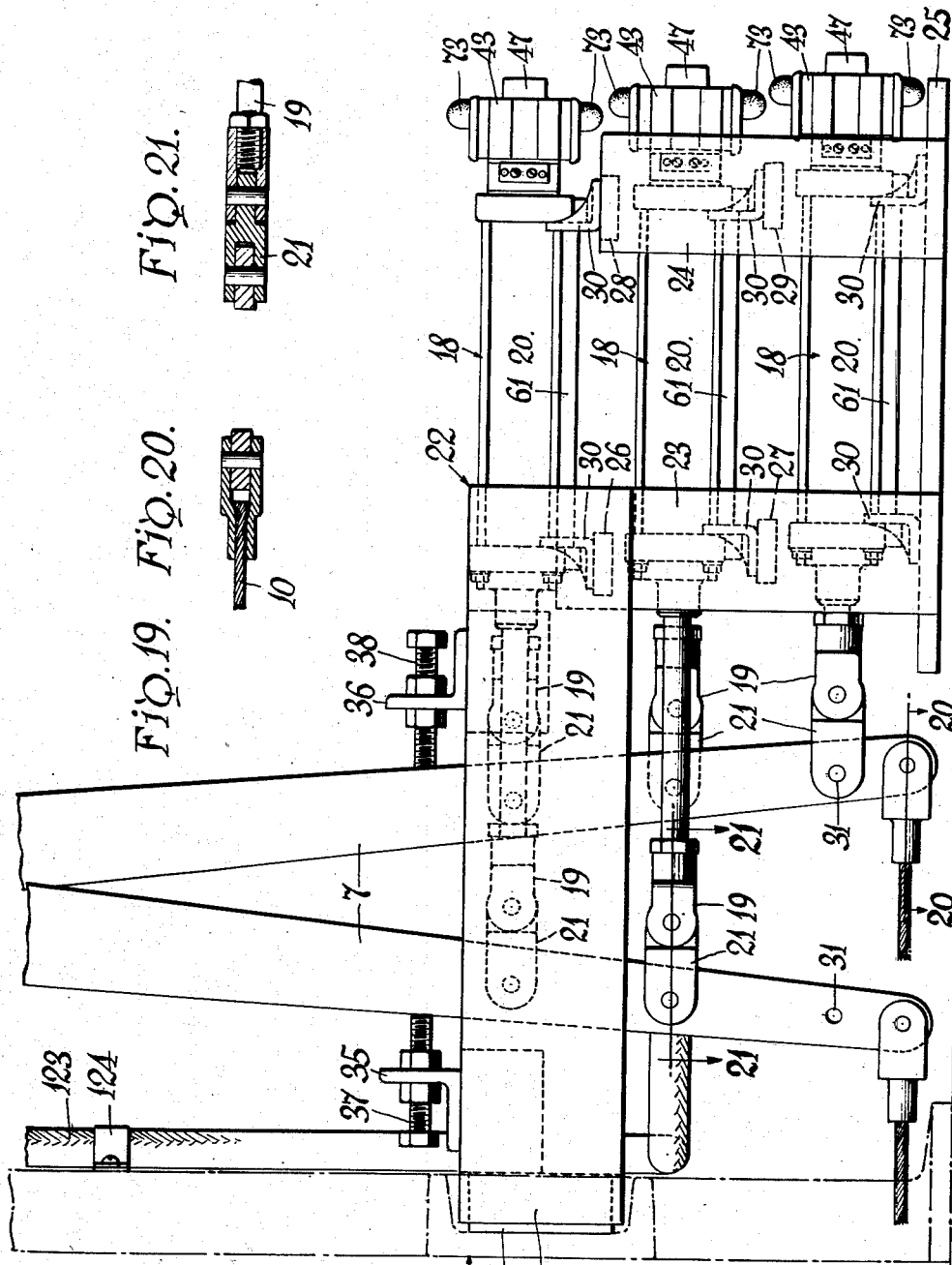

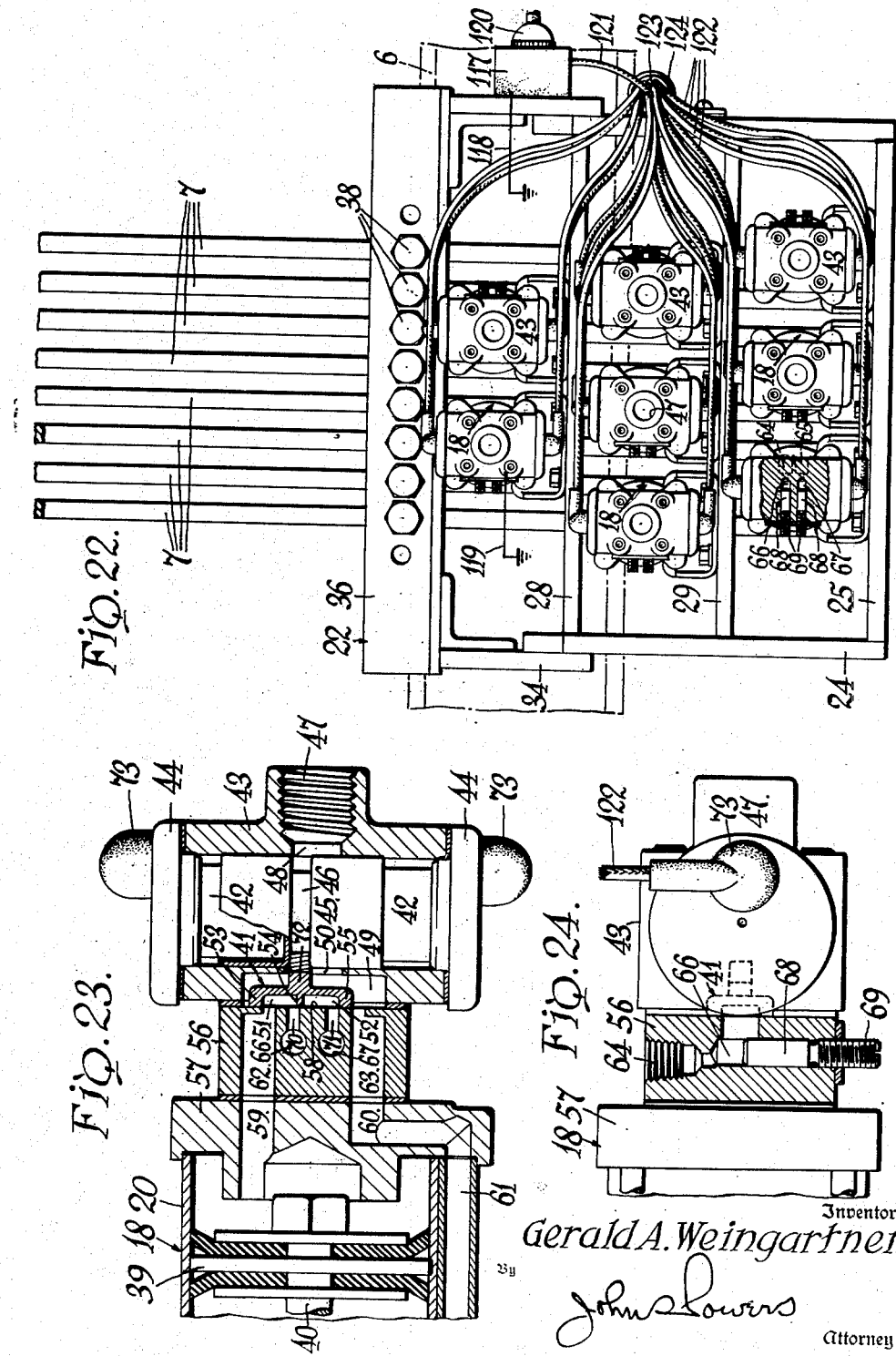

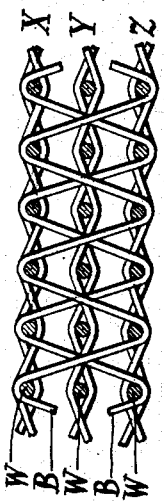
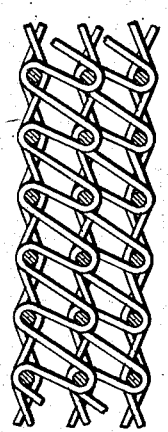
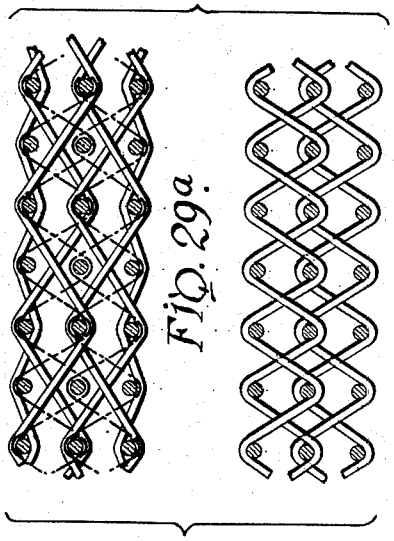

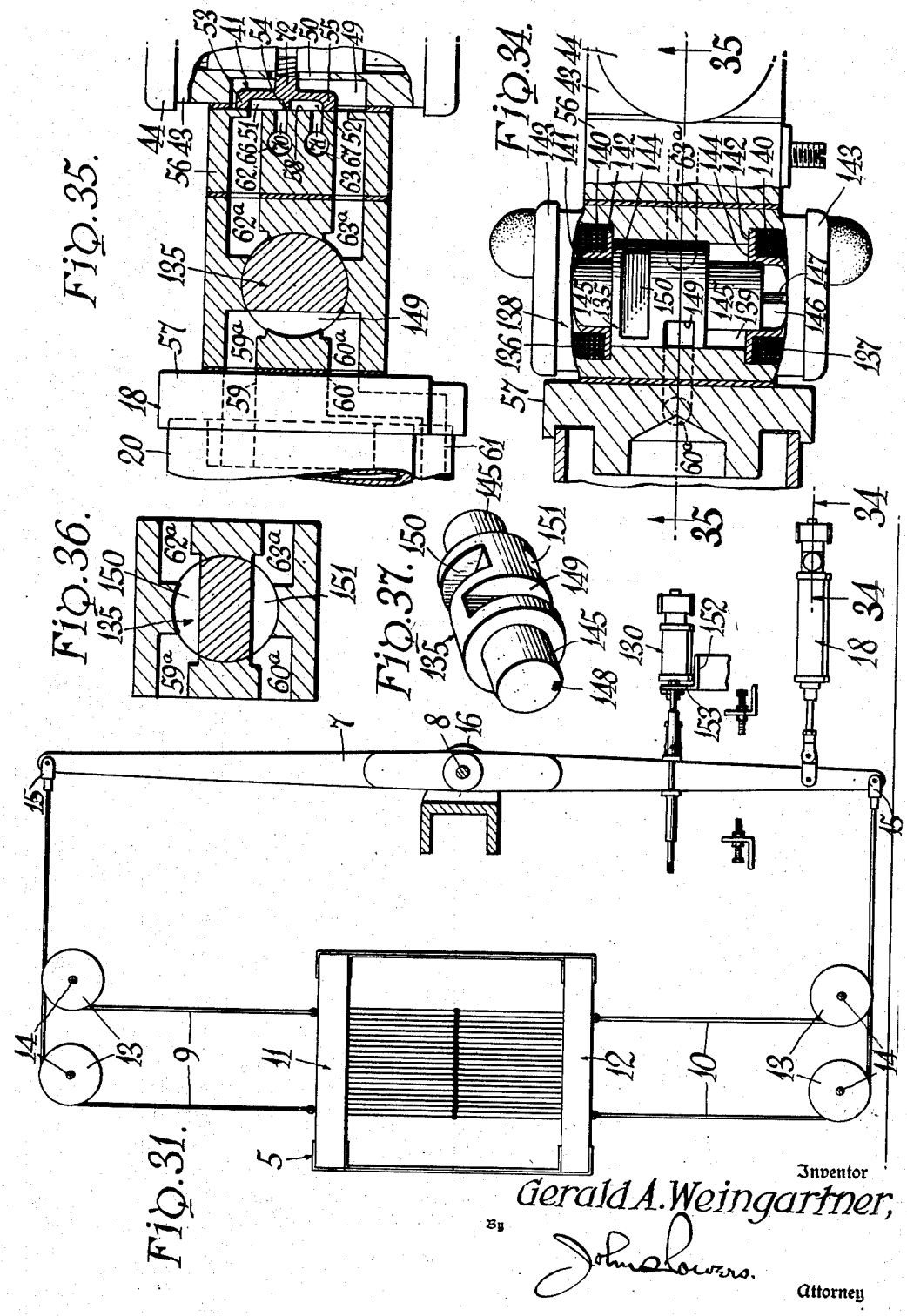

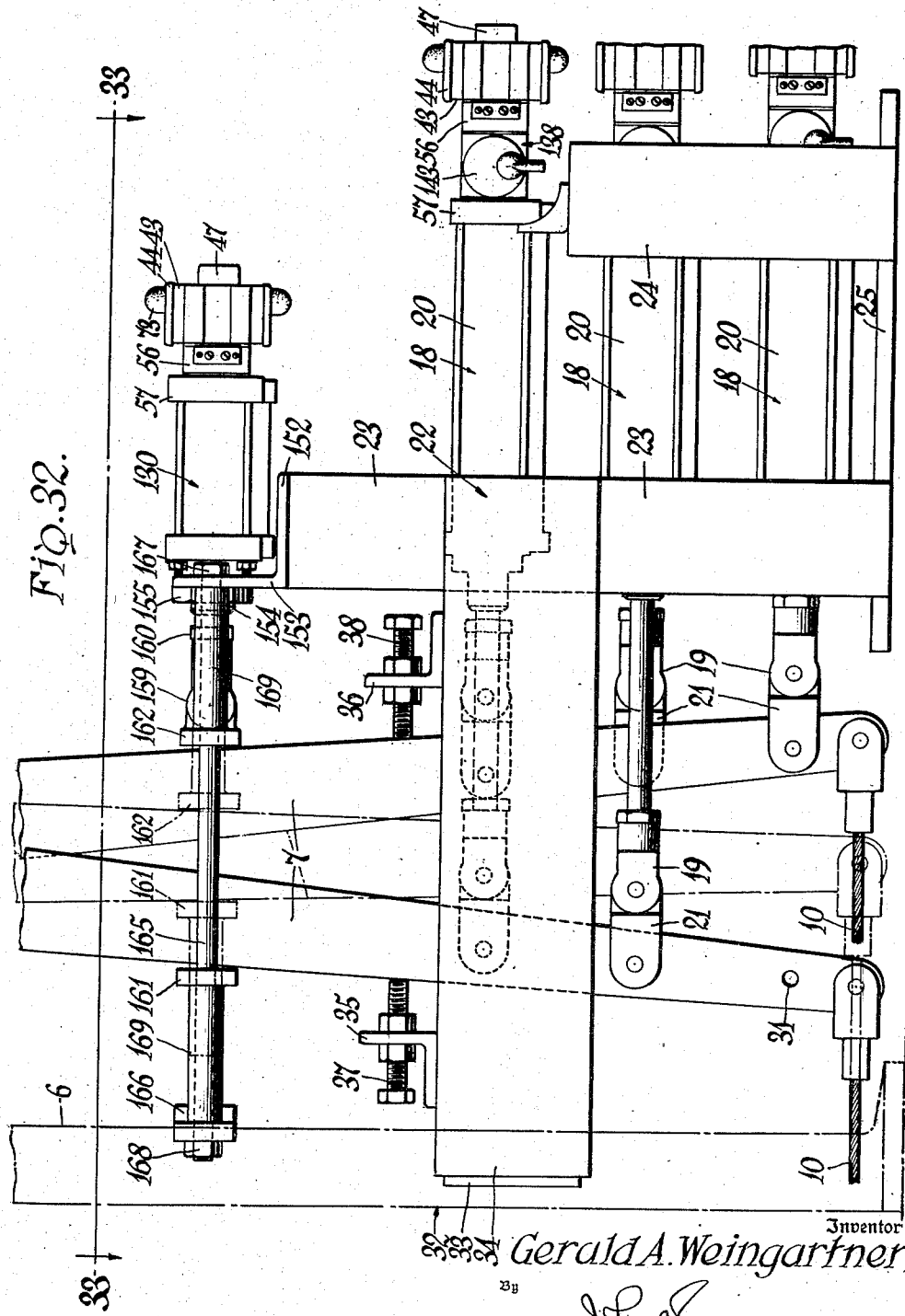

Aug. 31, 1954

G. A. WEINGARTNER 2,687,750

MECHANISM FOR CONTROLLING THE OPERATION
OF THE HEDDLE FRAMES OF LOOMS

Filed Oct. 17, 1952

Inventor
Gerald A. Weingartner,
By
John Lowne
Attorney

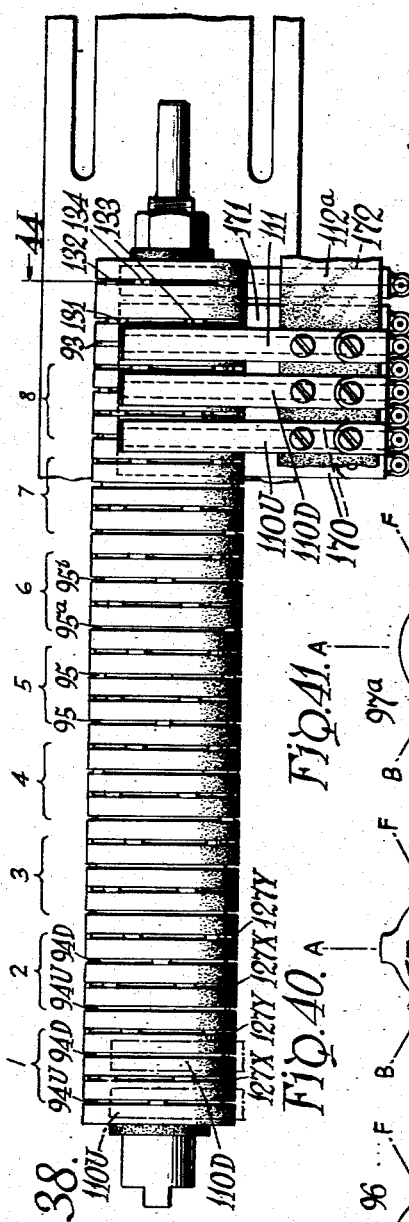

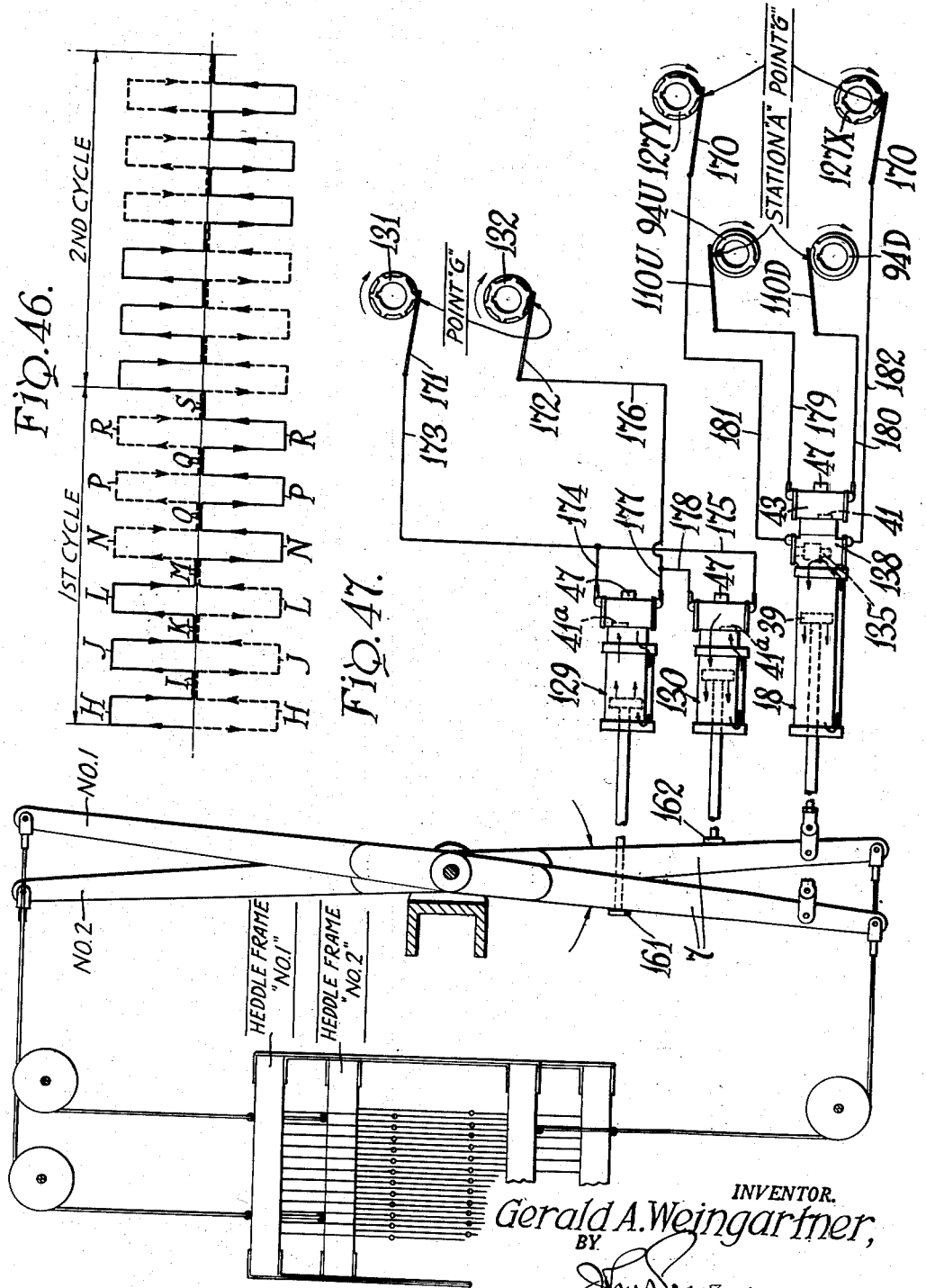

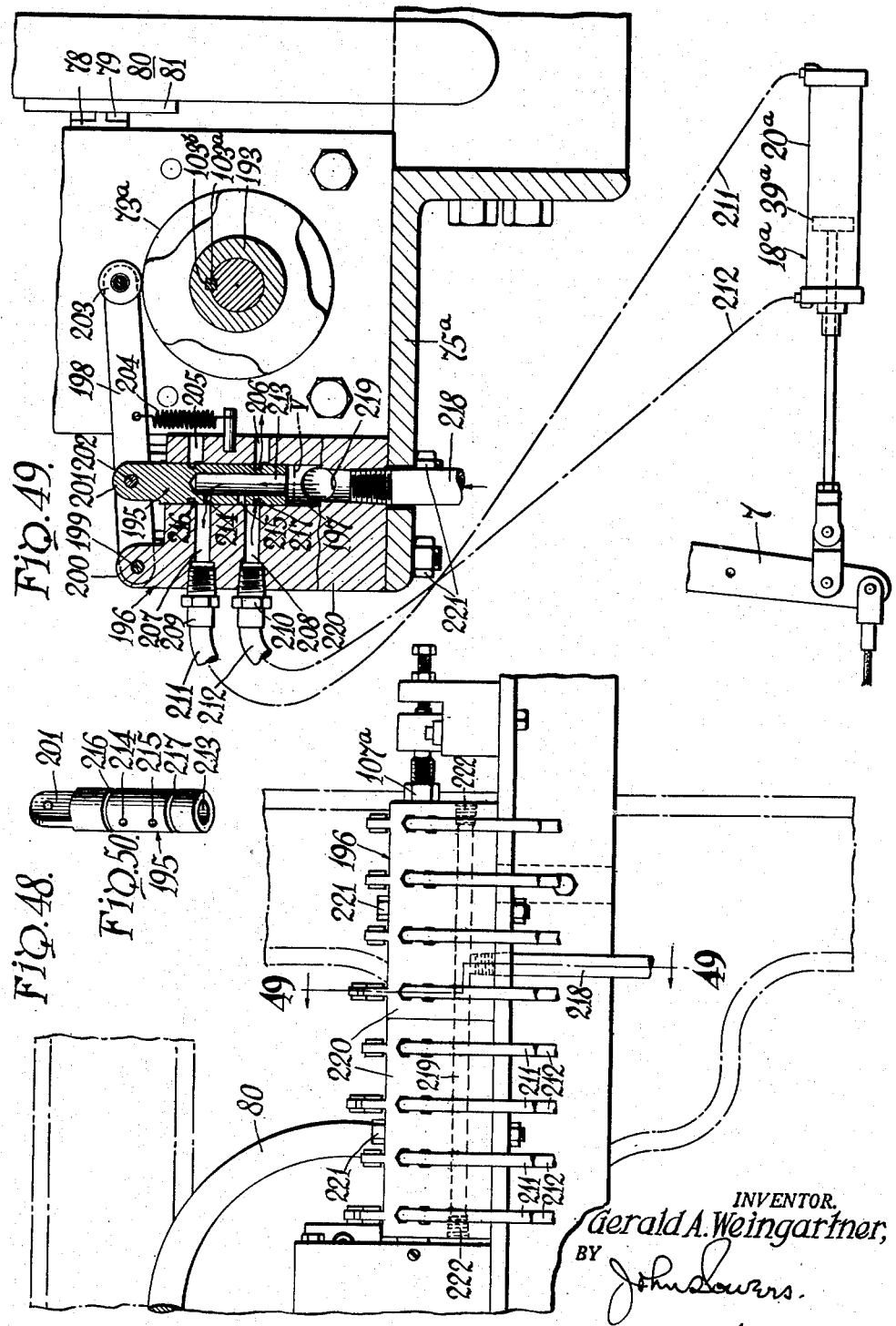

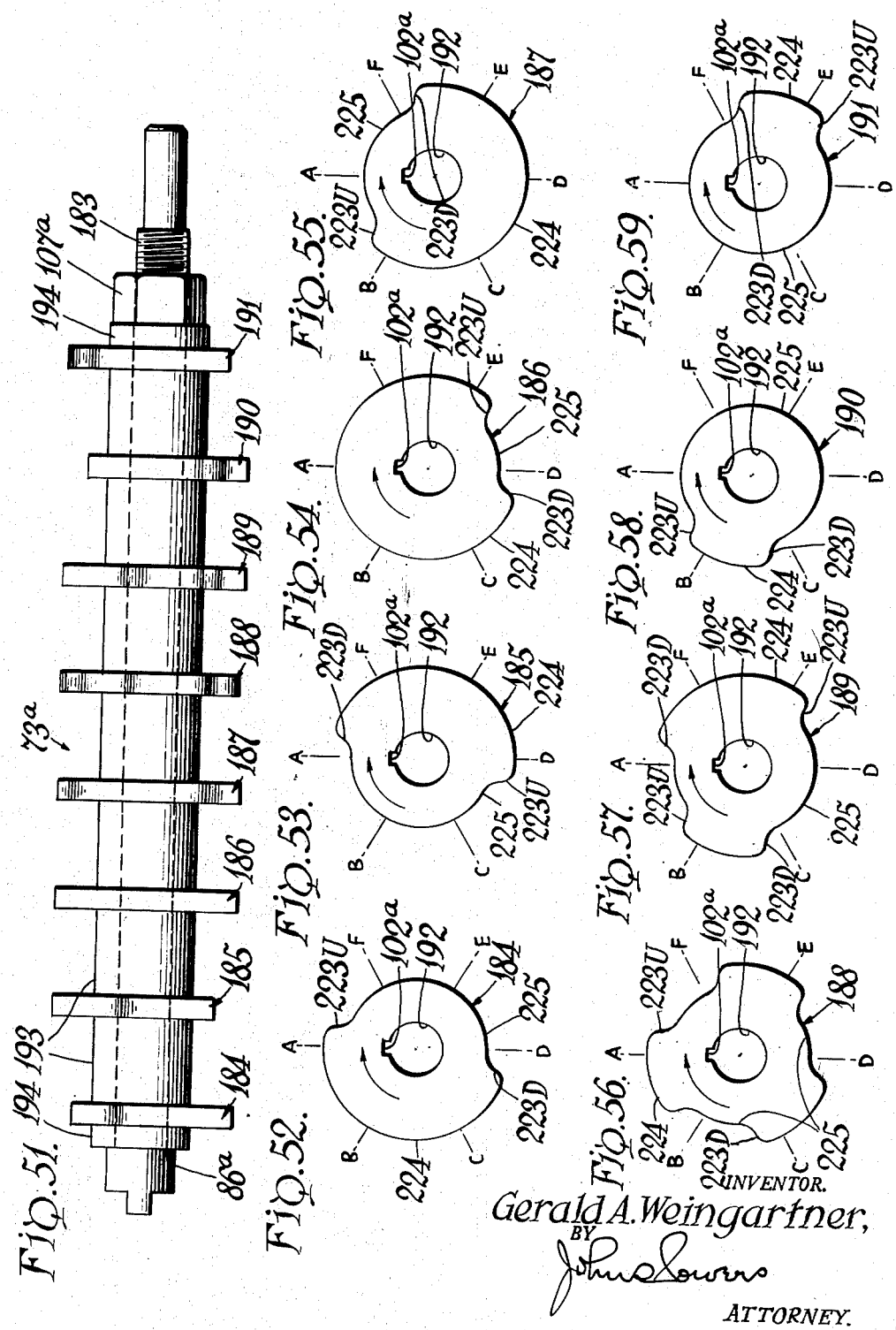

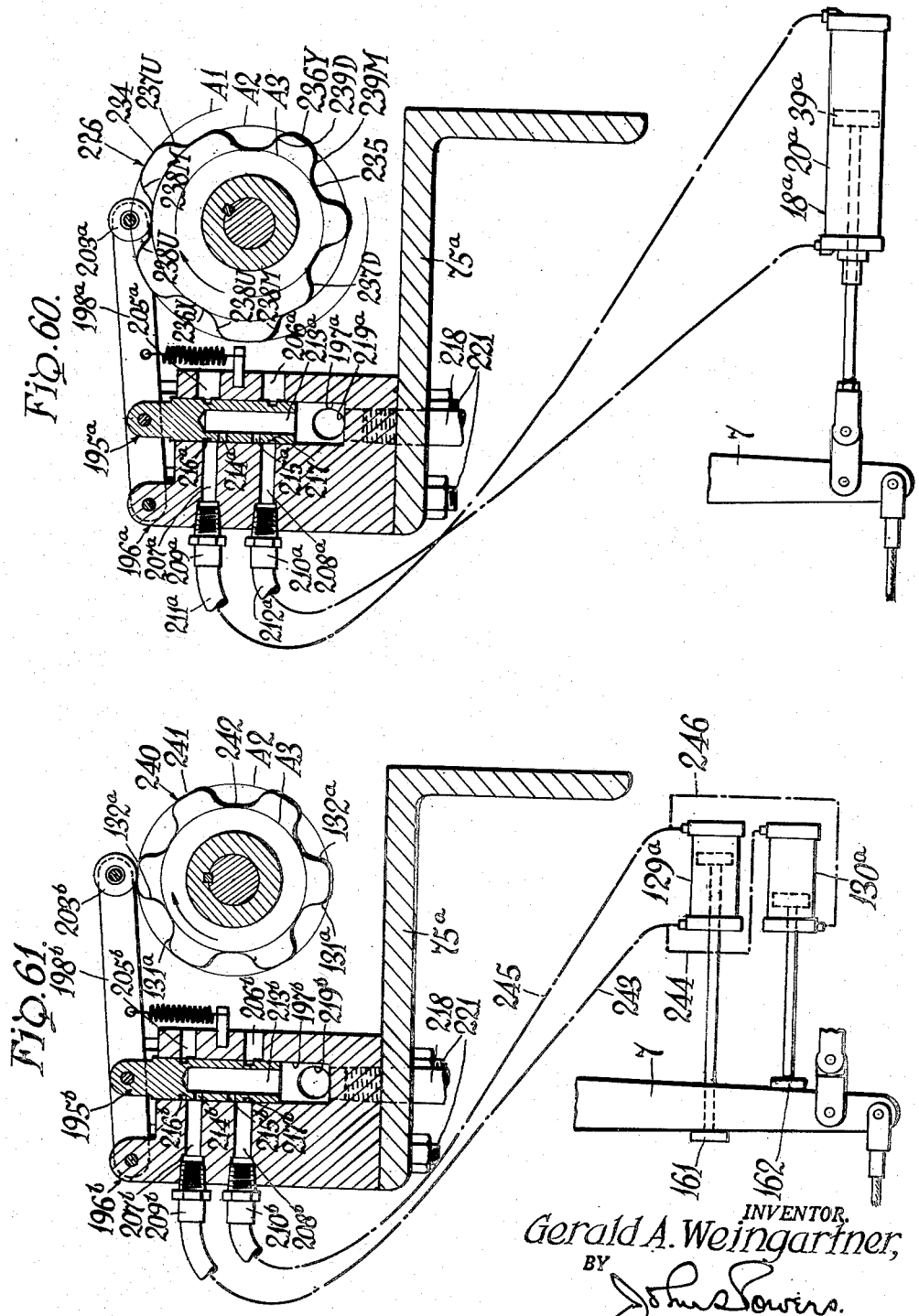

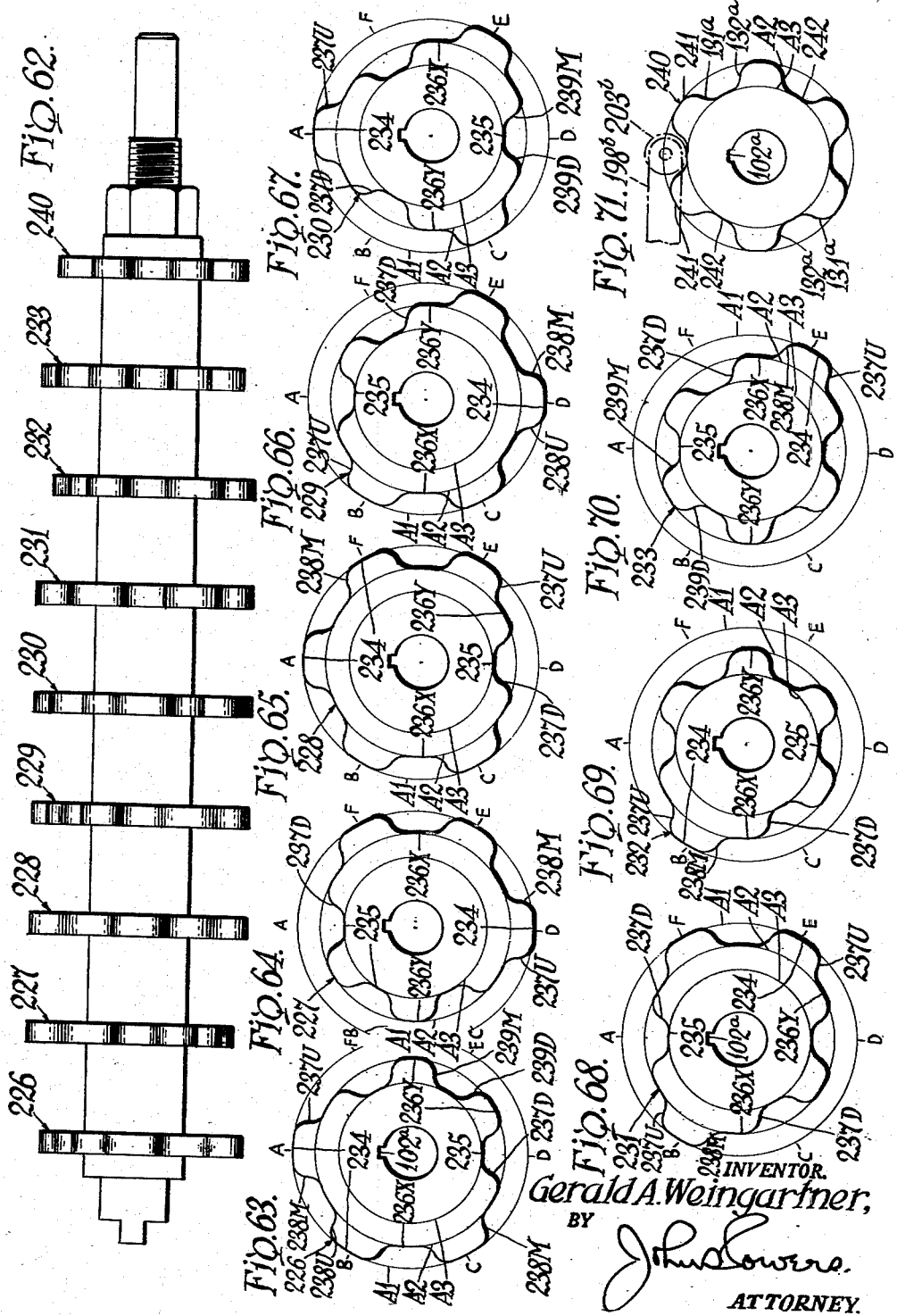

Patented Aug. 31, 1954

2,687,750

UNITED STATES PATENT OFFICE 2,687,750

MECHANISM FOR CONTROLLING THE OPERATION OF THE HEDDLE FRAMES OF LOOMS

Gerald A. Weingartner, Grand Island, N. Y., assignor to Globe Woven Belting Company, Inc., Buffalo, N. Y., a corporation of New York Application October 17, 1952, Serial No. 315,221

16 Claims. (Cl. 139—55)

This invention relates to mechanism for controlling the operations of the heddle frames of looms and has particular application, although not so limited in utility, to looms designed for the manufacture of woven canvas belting.

The principal uses of woven canvas belts are for driving purposes and as conveyers. These uses require many variations in respect to the number of plies and the structural patterns of weaving. For example, belts for conveyer use in a bakery and for transporting coal require different numbers of plies and different structural patterns. Because of the diversity of requirements the manufacturer must be prepared to furnish belting which in its various widths (within a range of the order of from one inch to more than 100 inches) as to plies will have a range to an ultimate of eight (in accordance with current practice) and as to structural patterns will have a range in excess of one hundred. In addition the manufacturer must be prepared to furnish belting produced by both open and split shed weaving, the latter method being used in cases where a harder or denser structure is required.

In looms for the manufacture of woven canvas belting the standard practice for generations has been to effect and control the operation of the heddle frames by a series of rotating cams having closed tracks. One or more cams are used for the operation of each heddle frame, the number required depending upon the width of the heddle frame. The cams are mounted on a continuously driven shaft timed in rotation in accordance with an operative cycle of the loom and correspond in form and relative arrangement to the predetermined heddle movement sequences for the production of a particular structural pattern of weave. Each cam, by suitable linkages, positively operates treadle-like levers operatively connected to a corresponding heddle frame for effecting its upward and downward movement.

The cams, as to numbers, form, and relative arrangement, accord with the predetermined number of plies, the predetermined pattern of weave and the type of weaving operation. When it is required that a loom be altered in one or more of these respects the cam shaft must be removed in order that the required new cam setup may be effected. Where the change involves the number of plies there must also be a complete change in the gearing. From an assembly standpoint this means in many cases the virtual rebuilding of the loom. The cam shaft organization is extremely heavy, the cams ranging in maximum diameters through a range of the order of twenty-four inches to thirty-six inches. For example in a loom having eight heddle frames for weaving three ply belting of either open or split shed type the weight of the cam shaft organization (with a minimum number of cams for the heddle frames) is of the order of 750 pounds. Such weight, substantially the same for either type of weaving, increases proportionately with an increase of the number of plies and for eight ply belting is in excess of 1500 pounds. It follows that the conversion of a loom for a change of weave involves a great amount of labor and time with correspondingly substantial operating loss. While certain types of looms have been proposed to facilitate conversion they have, nevertheless, required the services of four workmen for at least two days. In other types of looms conversion requires the services of four workmen for anywhere from two days to more than a week (depending on the structure of the particular loom and the nature of the change or changes required).

Sound policy therefore requires that the conversion of the looms be as infrequent as possible, thereby to minimize losses in plant operation. Implementation of this policy has necessitated a sufficient number of looms to maintain adequate stocks of belting within the extensive range of what may be called the usual requirements of customers. The number of looms thus necessitated by standard practice is substantially in excess of the number required by the practice of the invention according to which conversion for any of the purposes stated may be effected within a very short period of time, that is to say, of two hours or less. The comparative excess of the number of looms required by standard practice imposes substantial increments of capital investment, including space requirements. Moreover orders will be received with relative frequency for belting having a special weave which cannot be satisfied from the standard stocks in inventory. Conversion of one or more of the looms is therefore necessitated. In many cases the special orders will be for a relatively small amount of belting and are frequently insufficient even to meet the cost, due to conversion, of filling the order.

The production capacity of a loom depends on the number of picks per minute. In belt weaving the maximum number of picks per minute depends on the particular construction of the loom and is currently within a range of from one hundred (fifty complete shuttle reciprocations) to two hundred and twenty. This limitation is imposed by the time required for the cam action within a revolution of the cam shaft and a safely practical speed of cam shaft rotation. As the belting may be wider and the travel of the shuttle longer the number of picks per minute is correspondingly reduced.

Owing to the weight of the cam shaft organization, as above pointed out, the power requirements for the operation of a loom impose a substantial factor in the operating costs of plants which require a large number of looms.

The invention is applicable to either open or split shed weaving and its objects are:

First, to effect a substantial reduction in time and labor in the conversion of a loom for the weaving of a different pattern. Specifically the time is reduced from a range of between two days and more than a week to a range of from a few minutes to the order of not more than two hours, depending on the particular conversion; and the labor required is, in any case, reduced from four workmen to a single workman.

Second, to effect an economically valuable increase in the number of picks per minute. These, within practical limits, may be almost doubled. Specifically, they may be readily increased in respect to looms as currently manufactured to an approximate maximum of seventy-five percent per minute by an appropriate increase of the rotational speed of the loom drive shaft.

Third, to effect substantial manufacturing economy in the mechanism concerned with the operation of the heddle frames.

Fourth, to reduce by approximately half the power requirements.

The results are that a substantially smaller number of looms, requiring substantially less floor space, will effect substantially greater production; conversion may be made so economically that plant operating losses thereby occasioned are reduced in manifold degree; no operating loss is entailed on any order; substantial saving in labor costs is effected; the capital investment in looms is substantially decreased; and a substantial reduction in plant operating costs in respect to power requirements is achieved compatibly with the increase of the rotational speed of the loom drive shaft, greatly to increase the number of picks and the frequency, per unit of time, of the operative cycles of the loom.

The invention is generally characterized by a battery of relatively small and light-weight fluid pressure motors, one for each heddle frame alike in both open and split shed weaving; by mechanical operating connections between the motors and the corresponding heddle frames whereby these are moved positively in either direction, by a rotatable power-driven control unit, very compact and light in weight, timed in rotation in accordance with an operative cycle of the loom, and provided with elements which, together with devices with which they cooperate, are parts of a structural combination for effecting and controlling the operation of the valves of the fluid pressure motors, the design and arrangement of the controlling elements being in accord with the selected pattern of weave; by a control unit having a weight range for open shed weaving of the order of from three to eight pounds, (according to the range of patterns from three to eight plies) and for split shed weaving of the order of six plus to sixteen plus pounds, in other words slightly more than twice the weight for open shed weaving; and by the mounting of the control unit upon a part of the loom frame in such manner that when it is desired to convert the loom for the production of a different weave the control unit may be readily and quickly disconnected and removed and another fashioned in accordance with the new weave, as readily and quickly substituted. The fluid pressure motors are supported as a battery in such manner that their number may be readily increased or decreased as required and, according to their number, may be mounted at one or both sides of the loom. The controlling elements are preferably removably mounted upon the shaft of the control unit whereby other elements, appropriate to a different weave, may be easily and quickly substituted. In this way control units may be readily fashioned for any pattern of weave that may be required.

In the construction now considered as preferred the structural combination for the operation and control of the valves of the fluid pressure motors is of electrical character, the control unit being employed to energize electrical devices which effect and control the operation of the valves. Two forms of such a structural combination, one for open shed weaving and the other for split shed weaving, are herein shown. Within the contemplation of the invention the control unit and associated devices may be of mechanical character. Two forms of a mechanical structural combination, one for open shed weaving and the other for split shed weaving, are also herein shown.

In the drawings:

Figures 1 to 24 assume as an example a loom having eight heddle frames for open shed weaving of three ply belting and show an embodiment of the invention in which the structural combination for prescribing the operations of the heddle frames is of electrical character.

Figure 2 is an enlarged partial side elevation of the loom showing sundry details of the electrical connections directly cooperative with the rotating control unit.

Figure 3 is an end elevation of the rotating control unit and electrical connection features shown in Figure 2.

Figure 4 is a top plan view of the rotating control unit and electrical connection features as shown in Figure 2.

Figure 5 is a partial vertical sectional view on the line 5—5 of Figure 4.

Figure 6 is a vertical sectional view on the line 6—6 of Figure 4.

Figure 7 is a vertical sectional view on the line 7—7 of Figure 4 showing details of the rotating control unit and associated electrical connections.

Figure 8 is an elevation of the rotating control unit.

Figures 9 through 16b are side elevations of certain of the contact rings of the control unit.

Figure 9 shows a contact ring which is in continuous or permanent electrical engagement with an associated contact.

Figures 10 to 15 show contact rings which have each a single contact finger. These rings differ in the locations of their contact fingers with relation to a common point of reference.

Figure 16 shows a contact ring having three equidistantly spaced contact fingers. Another contact ring of similar form is provided which has its contact fingers (indicated by broken lines in the figure) differently located with relation to the common point of reference.

Figures 16a and 16b show two companion contact rings for the control of a particular heddle frame. These rings each have two contact fingers with different mutual spacing and the figures show the contact fingers of each ring in the positions which they occupy relatively to the contact fingers of the companion ring.

Figure 17 is a schematic elevational view of two cooperatively related heddle frames and the connections actuated by the fluid pressure motor for effecting their movements.

Figure 18 is a horizontal sectional view on an enlarged scale (with parts in top plan elevation) on the line 18—18 of Figure 17, showing more particularly the fluid pressure motor actuated connections for effecting the movements of the heddle frames.

Figure 19 is a partial side elevation of certain parts shown in Figure 18, including details of the fluid pressure motor actuated connections and associated features for effecting the movements of the heddle frames.

Figure 20 is a horizontal sectional view taken on the line 20—20 of Figure 19.

Figure 21 is a horizontal sectional view taken on the line 21—21 of Figure 19.

Figure 22 is an end elevation, with parts broken away and in section, showing the valve boxes associated with the fluid pressure motors and those parts of the fluid pressure motor actuated connections which are shown in Figures 18 and 19.

Figure 23 is a sectional view with parts in elevation showing details of one of the fluid pressure motors and of the associated valve and valve box.

Figure 24 is a plan view of the parts shown in Figure 23, certain features of the valve organization being shown in horizontal section.

Figures 25, 27 and 29—29a illustrate different three-ply structural patterns which may be produced by weaving of either open or split shed type.

Figures 26, 28 and 30 show charts and are respectively companions to Figures 25, 27 and 29—29a, the companion relationship being indicated by brackets.

Figure 25 is a vertical longitudinal sectional view of a conventional structural pattern of three ply weave.

Figure 26 is a chart of the positions of the contact fingers of the rings shown in Figures 10 to 16b in an operative phase of the movement of a control unit as shown in Figure 8 which is particularized for the production of belting of the pattern shown in Figure 25 for which eight heddle frames are required.

Figure 27 is a vertical longitudinal sectional view of a second structural pattern of conventional three ply weave having interlocking binders.

Figure 28 is a chart of the positions of the fingers of the contact rings in an operative phase of a control unit particularized for the pattern of weave shown in Figure 27.

Figures 29 and 29a are conjointly views illustrating a third structural pattern of three ply weave which has interlocking warp ends and interlocking binders, the views being taken in different vertical longitudinal planes. This scheme of illustration is adopted for the purpose of simplicity, the binders shown in Figure 29a being indicated in Figure 29 by dot and dash lines. The pattern of weave shown in Figures 29 and 29a involves ten warp threads and hence requires ten heddle frames.

Figure 30 is a chart of the positions of the fingers of the contact rings of a control unit particularized for the pattern of weave shown conjointly in Figures 29 and 29a.

Figures 31 to 47 show a structural combination of electrical character for split shed weaving.

Figure 31 is a schematic view similar to Figure 17 showing harness parts for effecting the movements of the heddle frames as in all instances subject in certain operational phases to two additional fluid pressure motors which may be called "neutralizing motors."

Figure 32 is a view similar to Figure 19 and showing sundry details of the fluid pressure motor actuated connections and associated features for effecting the movements of the heddle frames, these details being in accordance with the showing of Figure 31.

Figure 1:
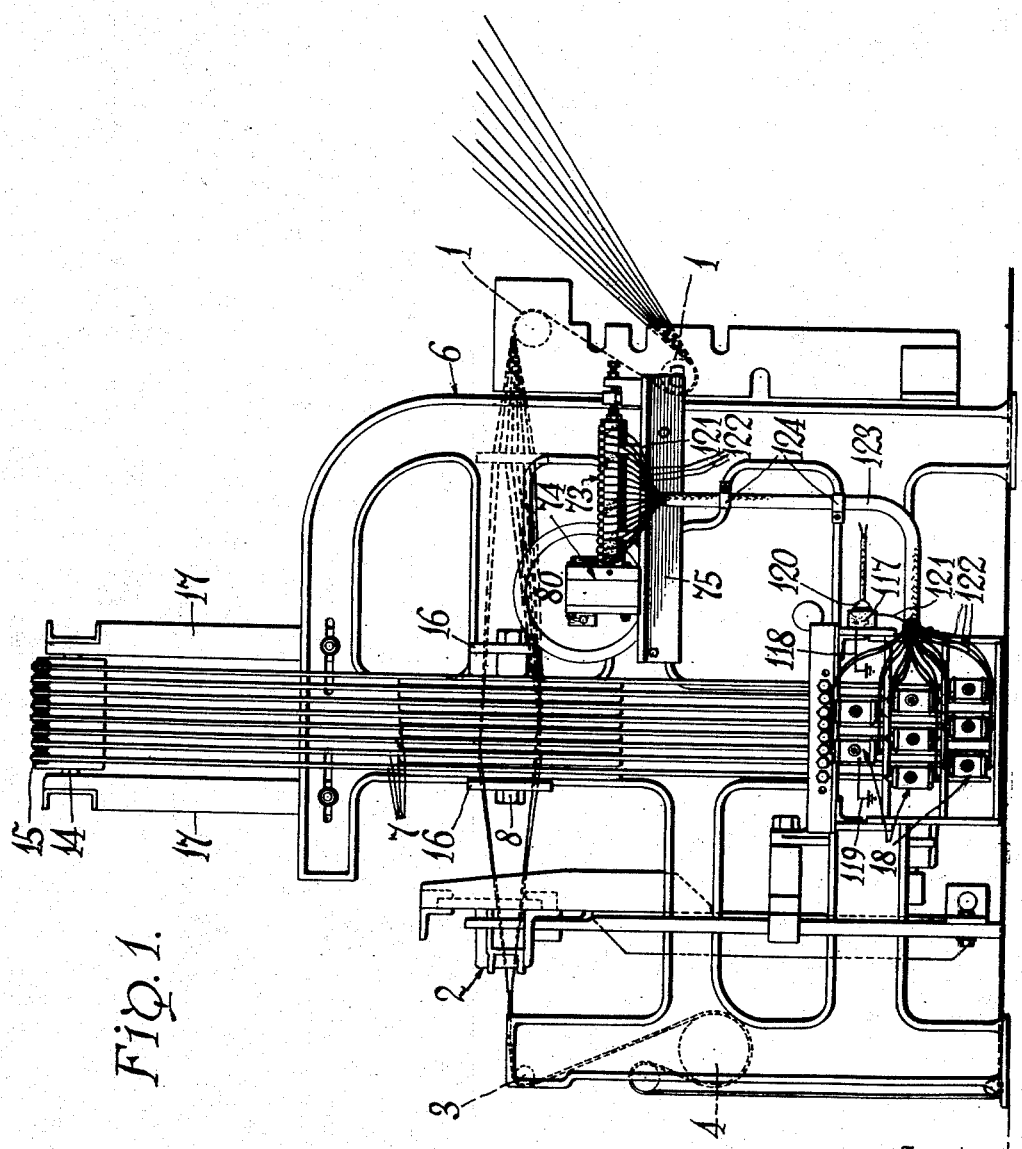
Figure 1 is a side elevation of the loom.
Figure 33:
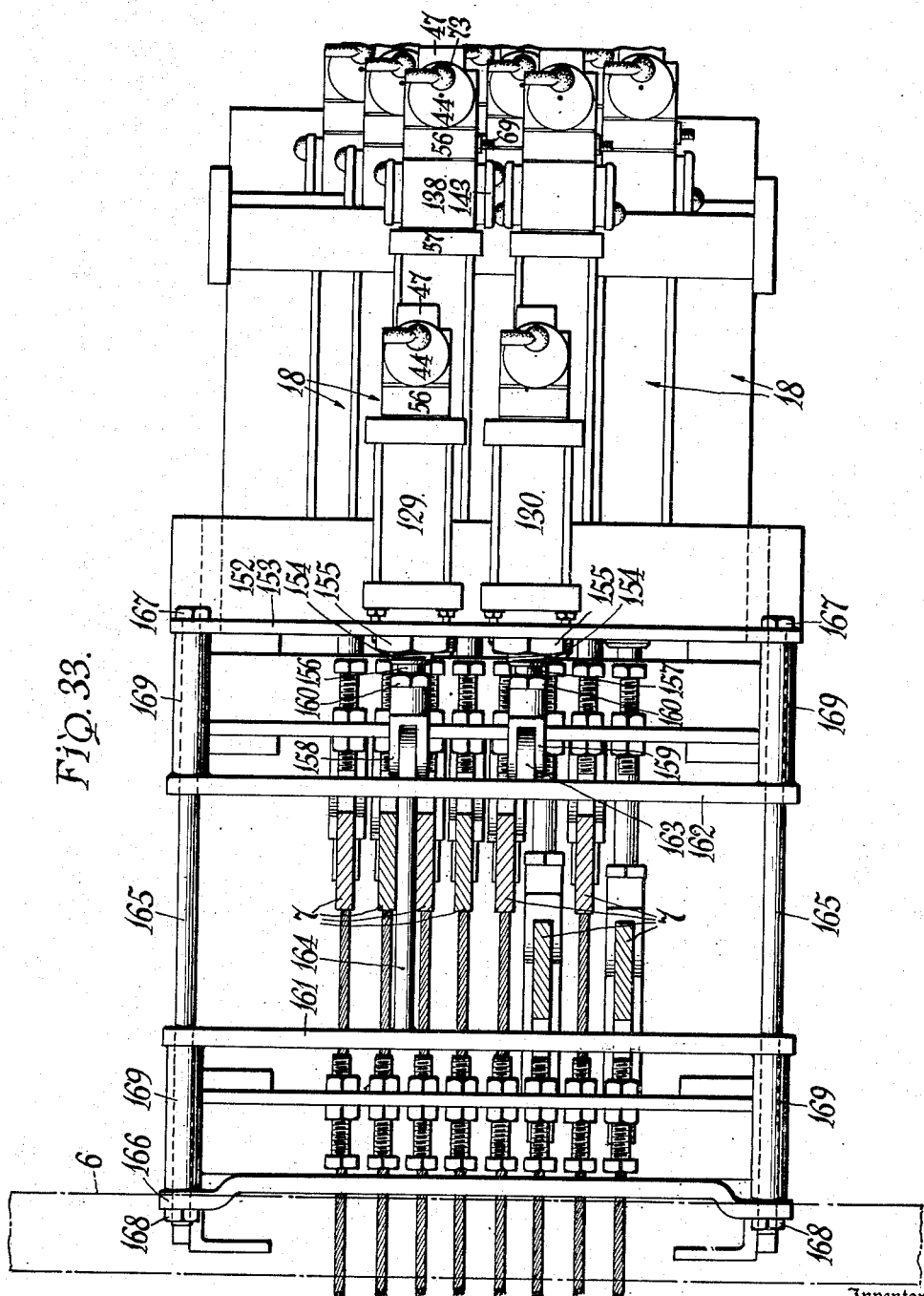

Figure 33 is a horizontal sectional view (with parts in top plan elevation) on the line 33—33 of Figure 32.

Figure 34 is a horizontal sectional view, looking in the direction of the arrows, on the line 34—34 of Figure 31.

Figure 35 is a vertical sectional view in the plane of the line 35—35 of Figure 34 showing a solenoid operated slidably mounted heddle frame return valve in a position to cut off the supply of air to the associated fluid pressure motor cylinder and to by-pass the air within the cylinder from one end thereof to the other.

Figure 36 is a vertical sectional view in the plane of the line 35—35 of Figure 34 and assumes the shifting of the heddle frame return valve to a position in which it provides for the operative flow of air in relation to the associated fluid motor.

Figure 37 is a perspective view of the heddle frame return valve.

Figure 38 is an elevation showing a control unit for closed shed weaving and (in partial elevation) associated stationary contacts.

Figure 39 shows one of twelve similar contact rings included in the control unit shown in Figure 38 and which corresponds structurally to the ring shown in Figure 10.

Figure 40 shows a ring which corresponds structurally to the ring shown in Figure 16 and is one of two companion rings of similar form included in the control unit shown in Figure 38, the contact fingers of the second ring being indicated by broken lines in their positions relative to the contact fingers of the ring shown.

Figure 41 shows a contact ring included in the control unit shown in Figure 38 and which corresponds structurally to the ring shown in Figure 16a.

Figure 42 shows a contact ring included in the control unit shown in Figure 38 and which corresponds structurally to the ring shown in Figure 16b, this ring being a companion of the ring shown in Figure 41 and being shown with its contact fingers in the positions which they occupy relatively to the contact fingers of the ring shown in Figure 41.

Figure 43 shows a contact ring of different form which is one of eighteen similar rings incorporated in the control unit shown in Figure 38 and provided for certain operations required in split shed weaving. The contact rings of this form are designated in the description which follows, according to their particular functions, as "heddle return rings" and "neutralizing rings" and are cooperatively associated in paired relation, the figure showing by broken lines the relative positions of the contact fingers of the companion ring of a pair.

Figure 44 is a vertical sectional view on the line 44—44 of Figure 38.

Figure 45 is a horizontal sectional view, looking in the direction of the arrows, on the line 45—45 of Figure 44.

Figure 46 is a diagram of the movements and relative positions of the first two heddle frames for the weaving of the warp binder threads of the pattern shown in Figure 25 through a period of two cycles of the loom operation.

Figure 47 is a diagram showing the two additional fluid pressure motors as operating in the shed closing phase in relation to the levers for the operation of the heddle frames and also showing, by wiring diagrams, the operative sequences of the several contact rings for the energization of the solenoid valve operating features of the several fluid pressure motors.

Figures 48 to 59, taken collectively, illustrate an embodiment of the invention in a modified form for the production by open shed weaving of the same pattern of weave (shown in Figure 25) that is produced by the control unit shown in Figures 8 and 38 and in which its elements and the devices with which they cooperate are of mechanical character.

Figure 48 is an enlarged partial side elevation of the loom showing the casing for the valves and sundry details of the mechanical connections.

Figure 49 is a vertical sectional view on the line 49—49 of Figure 48, this figure also showing diagrammatically the air flow paths between one of the valves and a corresponding fluid pressure motor.

Figure 50 is a perspective view of one of eight similar valves in cooperation with the control unit.

Figure 51 is an elevation of the control unit.

Figures 52 to 59 are side elevations of rotatable cams mounted on the control unit and which are elements of the mechanism for operating the valves that control the paths of air flow.

Figures 60 to 71 show a structural combination of mechanical character for split shed weaving.

Figure 60 is a vertical sectional view of the control unit and an associated valve organization, the section being taken in a diametrical plane of the control unit and showing a cam and valve for the control of the operation of a fluid pressure motor directly connected to the operating lever of a corresponding heddle frame.

Figure 61 is a vertical sectional view of the control unit and another associated valve organization, the section being taken in another diametrical plane of the control unit and showing a cam and valve for the control of the operation of the two neutralizing fluid pressure motors.

Figure 62 is an elevation of the control unit.

Figures 63 to 70 are side elevations of the eight cams which severally incorporate the features of the eight cams shown in Figures 52 to 59.

Figure 71 is a side elevation of the additional cam for controlling the operation of the two neutralizing fluid pressure motors. This figure, as compared with Figure 61, shows the cam in shed opening position and shows the engaging portion of the associated valve operating lever in broken lines.

The features of the invention are incorporated in a loom which, except for the omission of the cams for the operation of the heddle frames, may be of any standard construction appropriate for belt weaving, the loom having the usual warp beam and thread guide (not shown), the warp guide and tensioning rollers 1, the lay assembly 2 with its usual features (lay and its oscillating supporting arms, shuttle boxes, picker sticks, and operating gearing therefor and reed carried by the lay), the breast beam 3, the take-up roller 4 and the heddle frames 5 (Figure 17). Since these parts are unchanged they require no detail illustration or description.

In the detail description which follows the expression "a cycle of loom operation" is defined as encompassing the number of weft threads laid, according to the particular pattern of weave, in complete reciprocations (two opposite vertical movements in each instance) of companion heddle frames.

The various parts, in accordance with the invention, for the operation of the heddle frames 5 may be supported in any position with reference to the loom which will best accord with the particular type of loom. In the construction herein shown these parts, accordingly as their number may require, may be supported by one or both of the loom side frames 6. Figures 1 to 24 assume eight heddle frames and open shed weaving in which case only one of the side frames 6 is required as a support for the operating parts.

Where, as shown, the operating parts are supported by a side frame 6 the reciprocation of each heddle frame is effected by an actuating part mounted for reciprocatory movement, this part being preferably a two-armed lever 7 (Figure 17) movable in a vertical plane and mounted midway between its ends and at the outer side of the side frame 6 upon a horizontal supporting rod 8. The harness otherwise includes the usual cables 9 and 10 provided in pairs and connected respectively to the upper and lower cross bars 11 and 12 of the heddle frame, the cables being trained over the usual sheaves 13 mounted on fixed cross bars 14. The ends of the cables are connected by horizontally pivoted coupling brackets 15 to the upper and lower ends of the lever 7. When the upper arm of the lever 7 moves to the right its lower arm has compensating movement to the left (Figure 17 being considered) and the heddle frame 5 is raised. Similarly when the lower arm of the lever 7 moves to the right its upper arm has compensating movement to the left and the heddle frame is lowered. The supporting rod 8 is carried by a pair of brackets 16 secured to and projecting laterally outward from a horizontal bar of the frame 6.

The loom has the usual provision for varying the number of heddle frames. Thus the bars 14 upon which the sheaves 13 are mounted are longer or shorter according to the number of sheaves which they carry. This is sufficiently shown in Figure 1 in connection with the upper bars 14, the ends of which are fitted in brackets 17 mounted for adjustment as to their spacing, the brackets 17 being suitably connected for support to horizontal bars of the frames 6.

The levers 7 are mechanical operating connections between the heddle frames and corresponding fluid pressure motors 18. These are mounted as a battery in an arrangement which is relatively compact and requires only a small amount of space at the side of the loom frame. The movable parts of the motors are preferably the piston rods which have extensions 19, the motor cylinders 20 being fixed and preferably horizontally positioned. The connection between each piston rod extension 19 and corresponding lever 7 consists of a clevis 21 (Figures 19 and 21) pivoted on horizontal axes.

The motors 18 are conveniently mounted in horizontal tiers, one above the other, adjacent the outer side of the side frame 6 and are supported by a cage designated generally as 22 (Figures 1, 18, 19 and 22). The cage includes pairs of inner and outer uprights 23 and 24, corresponding uprights of the pairs being in common planes in the transverse direction of the loom. The uprights are connected by a bottom plate 25 which provides a shelf for the support of the motors 18 of the lower tier. The uprights 23 also carry upper and lower horizontal shelves 26 and 27 and the uprights 24 similarly carry upper and lower horizontal shelves 28 and 29. The shelves 26 and 28 are in a common horizontal plane and provide support for the motors 18 of the upper tier. The shelves 27 and 29 are in a common horizontal plane and provide support for the motors 18 of the intermediate tier. Cradles 30, mounted on the plate 25 and the shelves 26, 27, 28 and 29, serve as the direct support for the fluid motor cylinders 20, the cradles conforming to the curvature of the cylinders and adjoining the end heads of the cylinders. The lower arms of the levers 7 are provided with openings 31 (Figure 17) at different elevations and, as best shown in Figure 19, according to the particular tier in which a motor 18 may be located a corresponding clevis 21 may have its pivotal connection with the lever 7 located in any appropriate opening 31. It will be noted that the openings 31 in the direction from the lower opening to the upper opening will be at progressively shorter distances from a vertical center line taken through the rod 8 upon which the levers 7 are mounted. Since the cylinders of the motors 18 are all preferably of the same length the location of these cylinders is selected to accord with the varying distances of the openings 31 from the vertical center line. This is clearly shown in Figure 19 in which the cylinders 20 of the intermediate tier of the motors 18 are located in inwardly offset relation to the cylinders of the motors of the lower tier and the cylinders of the motors of the upper tier are similarly located with respect to the motors of the intermediate tier.

The frame of the loom beyond which the battery of motors 18 is located includes a horizontal beam 32 (Figures 18 and 19) preferably of channel section to which vertical angle brackets 33 are secured in appropriately spaced relation. The brackets 33 are provided for the support of laterally and outwardly projecting parallel horizontal arms 34 which carry the cage 22, the arms having their inner end portions rigidly secured, as by bolt fastenings, to the brackets 33 and their outer end portions attached, as by welds or otherwise suitably, to the upper end portions of the uprights 23.

The arms 34 carry inner and outer cross brackets 35 and 36. The lower arms of the levers 7 extend through the space between the brackets 35 and 36, these carrying regulating screws 37 and 38, respectively, in opposed series with the several screws of one series in alinement with corresponding screws of the other series. The screws 37, functioning as motion stops, are engaged by the inner edge faces of the levers 7 and the screws 38, similarly functioning, are engaged by their outer edge faces. The primary purpose of the screws 37 and 38 is to determine both the extent of the oscillatory strokes of the corresponding levers 7 and the location of their extreme positions relatively to the vertical center line taken through the rod 8. As the screws are adjusted outward relative to one another the oscillatory strokes of the corresponding lever 7 will be longer and vice versa. As the screws occupy particular positions in their paths of adjustment they determine the extreme positions of the levers 7 relatively to the center line. Thereby the screws 37 and 38 serve for determining both the extent of reciprocatory strokes of the several heddle frames 5 and the particular elevations of each heddle frame at the upper and lower limits of its reciprocation. Such determination enables the heddle frames from front to rear of the series to have progressively longer strokes whereby an optimum shed formation may be obtained without any mechanical complication.

In addition to their primary purpose above described the screws 37 and 38 are available to correct the positions of the heddle frames if, because of any mechanical fault, they should be raised or lowered too far with an adverse effect upon the shed. In looms in which the heddle frames are connected to cables the correction is ordinarily made by turnbuckles. The screws 37 and 38 enable the correction to be made with much greater facility and eliminate the necessity of turnbuckles.

The fluid pressure motors 18 (Figure 23) include a piston 39 mounted on a rod 40 which carries the extension 19. Air admitted sequentially to the opposite ends of the cylinder 20 effects a reciprocation of the piston 39. The air admission and exhaust is governed by a solenoid operated slide valve 41. The motor 18, its controlling valve organization and the solenoid valve operating features are of standard construction and in industrial practice these parts are furnished as a unit or assembly by the manufacturer (the unit selected for illustration being a product of The Bellows Company of Akron, Ohio). These parts are therefore herein shown and described only to such extent as is necessary for an understanding of the operational characteristics of the embodiment of the invention now under consideration.

Referring to Figure 23: The valve 41 is operated by two (upper and lower) alining solenoids which are sufficiently indicated by the showing of their casings 42. These casings are mounted in a vertical valve box 43 closed at its ends by caps 44 to which the casings are attached. The solenoid armatures (not shown) govern the reciprocation axially of the valve box 43 of a floating piston 45 having a centrally located annular channel 46. In the combination of elements which constitutes the invention the pistons 45 are devices for moving the valves 41 between their extreme positions and for holding them in either extreme position for a predetermined period during a cycle of the operation of the loom. The box 43 is provided with an air inlet collar 47 connected to a compressed air supply (not shown) and communicating in any position of the piston 45 by a port 48 with the space delimited by the channel 46. The inner vertical wall of the valve box is formed with a recess 49 open to the outer face of the wall and at all times communicating by a port 50 with the space delimited by the channel 46. The slide valve 41 is arranged within the recess 49 for vertical reciprocatory movement, the vertical walls of the recess providing guides. The outer face of the valve 41 is dished or recessed to provide upper and lower channels 51 and 52 and upper, lower and central horizontal projections 53, 54 and 55, respectively. The valve 41, according to its position, determines the air flow circuits and in this capacity cooperates with a block 56 arranged between the valve box 43 and the outer head 57 of the cylinder 20, the block having gasket sealed attachment to these parts and thereby providing support for the valve box. The projections 53, 54 and 55 extend beyond the face of the valve box sufficiently to compensate for the thickness of the sealing gasket and during the sliding movements of the valve bear in substantially sealed relation upon the adjoining face 58 of the block 56. The cylinder head 57 is provided with a passage 59 which communicates with the right end of the cylinder 20 and with a passage 60 which communicates by means of a pipe 61 (Figure 19) with the left end of the cylinder 20. The block 56 is provided with passages 62 and 63 which are at all times in communication with the respective passages 59 and 60 of the cylinder head 57. In one position of the valve 41 the passage 62 communicates with the upper channel 51 and in the other position the passage 63 communicates with the lower channel 52. The block 56 is formed with upper and lower air exhaust passages 64 and 65 (Figures 22 and 24) open to a side face and discharging to atmosphere, these having reduced inner ends which communicate with recesses 66 and 67 extending to the other side face. The recesses 66 and 67 serve two functions, that is to say they provide parts of the air flow paths and also provide casings for axially movable regulating stem valves 68 having threaded projecting terminal portions 69 tapped into the outer ends of the recesses. The recess 66 is in communication with the upper channel 51 of the valve 41 by a passage 70 and the recess 67 is similarly in communication with the lower channel 52 by a passage 71. As either of the valves 68 is adjusted inward or outward the discharge capacity of the corresponding exhaust flow path is proportionately reduced or increased. The movements of the floating piston 45 are directly communicated to the slide valve 41 whereby these two parts are movable as a unit. The valve 41 has upon its inner face a centrally located lug 72 and is biased into strong contact with the face 58 of the block 56 by a spring fitted in the channel 46 and bearing upon the lug. The floating piston 45 carries within the channel 46 a radially projecting pin (not shown) which has a socketed relation in the lug 72 and transmits the movement of the piston 45 to the valve 41. The solenoid electric wiring passes through the caps 44, the contact connections being protected by cup-like casings 73 of insulating material mounted on the caps.

The solenoid operating features are such that with the floating piston 45 in its lower position the upper solenoid is energized whereupon the piston is moved to its upper position as shown in Figure 23. After the proper interval, the lower solenoid is energized upon which the piston 45 is moved to its lower position.

The cycles of reciprocation of the pistons 45 of the several units are effected and controlled in a predetermined relative sequence throughout the operation of the loom for the production of a weave of the particular predetermined structural pattern.

When the piston 45 and slide valve 41 are in their upper positions, as shown, the air flow is as follows: From the inlet collar 47 through the channel 46, the port 50, the recess 49, the passages 63 and 60, and the pipe 61 to the left end of the cylinder 20 whereupon the piston 39 of the motor 18 is driven to the right, the piston being so shown in Figure 23. At the same time air in the diminishing space at the right of the piston 39 escapes to atmosphere through the passages 59 and 62, the upper channel 51 of the valve 41, the passage 70, the recess 66 and the exhaust passage 64, air being occluded by the projection 54 from the lower channel 52 of the valve 41. When the piston 45 and slide valve 41 are in their lower positions the air flow is as follows: From the inlet collar 47 through the channel 46, the port 50, the recess 49 and the passages 62 and 59 to the right end of the cylinder 20 whereupon the piston 39 is driven to the left. At the same time the air in the diminishing space at the left of the piston 39 escapes to atmosphere through the pipe 61, the passages 60 and 63, the lower channel 52 of the valve 41, the passage 71, the recess 67 and the exhaust passage 65, air being occluded by the projection 54 from the upper channel 51 of the valve 41. The purpose of adjusting the discharge capacity of the exhaust flow paths is to regulate the speed of movement of the piston 39 in either direction, a reduction of the discharge capacity resulting in a correspondingly slower rate of piston movement and vice versa.

When the floating valve-actuating piston 45 is moved from its lower position to its upper position by the energization of the upper solenoid the fluid motor piston 39 is driven to the right and the corresponding heddle frame is lowered. When the piston 45 is moved from its upper position to its lower position by the energization of the lower solenoid the fluid motor piston 39 is driven to the left and the corresponding heddle frame is raised.

The rotatable control unit, its driving connections and various parts associated with it are shown in Figures 1 to 16. In these figures the control unit is designed for open shed weaving and is designated generally as 73. The unit, its associated gear box 74 and other associated parts are supported by a horizontal shelf 75 suitably attached to the loom frame.

The control unit includes a shaft 76 upon which the various rotating contact parts (later to be described) are mounted. The shaft 76 is driven from the loom drive shaft 77 (Figure 4) by means of reduction gearing mounted in the gear box 74. The gearing includes a shaft 78 in axial alinement with the loom shaft 77 and having a square terminal portion 79 projecting beyond the gear box. The loom shown in the drawings is of a design which includes a hand wheel 80, fast on the loom shaft 77, for the initial adjustment of the loom features at the beginning of the loom operation. This hand wheel is advantageously used as a connection for driving the shaft 78 from the loom shaft and is fitted with a plate 81 (Figure 6) removably secured and having a square opening 81a in which the square terminal portion 79 conformably fits. The shaft 78 carries a worm 82 in mesh with a worm wheel 83 on a shaft 84 journalled in the side walls of the gear box. The shaft 84 alines with and directly drives the control unit shaft 76. For this purpose the shaft 76 carries a terminal collar 85 having a diametrical rib 86 and the adjacent end of the shaft 84 has a diametrical groove 87 in which the rib 86 conformably fits. The grooved end portion of the shaft 84 is located in a sleeve 88 which provides a bearing for the collar 85 and thereby serves as an end support for the shaft 76. At its opposite end the shaft 76 is supported by a bearing 89 mounted upon the shelf 75 and having a removable cap 90 through which the outer end portion of the shaft 76 projects. The shaft 76 is held against axial displacement, thereby to maintain the engagement of the rib 86 in the groove 87, by an alining screw 91 threaded through a lug 92 provided on the bearing 89, the terminal face of the screw engaging the outer terminal face of the shaft.

When the pattern of weave is to be changed the control unit is removed and an appropriate unit substituted, these operations being easily performed within but a few minutes of time. The removal of the original unit involves merely removing the bearing cap 90 and backing off the screw 91 to a suitable extent whereupon the control unit is freed for removal from the loom by pulling it outward to disconnect the rib 86 from the groove 87 and to withdraw the collar 85 from the bearing sleeve 88. The unit for the changed pattern is then substituted by holding it in alinement with the shaft 84, moving it inward to engage the rib 86 in the groove 87 and at the same time engaging its outer end in the bearing 89 whereupon the screw 91 is adjusted inward to its functioning position and the cap 90 is replaced.

The standard loom features first having been positionally adjusted by turning the loom shaft 77 by means of the hand wheel 80, the worm shaft 78 and shaft 76 of the control unit are initially set manually in order that the several rotatable contact fingers (later to be described) may be properly positioned for the beginning of the loom operation, thereby to insure the proper operative relationship of the control unit to the loom drive shaft 77. The plate 81 is then fitted upon the square terminal portion 79 of the worm shaft 78 in an angular position in accord with its initial setting. The plate 81 is then attached to the hand wheel 80 in the same angular position and with its opening 81a coaxial with the shaft 77. The control unit and its associated reduction gear features are then assembled in operative relation to the loom with the square terminal portion 79 of the shaft 76 fitted in the opening 81a of the plate 81. The loom is thereupon ready for operation.

In the case of looms which do not have a hand wheel on the loom shaft the gearing for driving the control unit may be driven by means of any suitable coupling from any convenient shaft of the loom and, of course, may effect any appropriate reduction. If the control unit should be driven from the standard cam shaft the gear ratio will, of course, be one to one.

The control unit includes rotatable contact rings. In the example selected for illustration seventeen of these are provided and variously have the forms shown in Figures 9 to 16b. One, designated as 93 (Figure 9), is in continuous connection with a current supply line and for convenience may be called a "line ring." The other sixteen govern the operation of the heddle frames and for convenience may be called "heddle rings." Twelve, designated as 94, and shown in Figures 10 to 15, are of similar construction in that they are each formed with a single radially projecting contact finger 96. Two, designated as 95, are of the form shown in Figure 16, and each have three radially projecting contact fingers 97 equidistantly spaced. Two, designated as 95a and 95b and shown in Figures 16a and 16b respectively, each have two radially projecting contact fingers 97a and 97b respectively, these differing in their mutual spacing. Each contact finger of each heddle ring once in each revolution of the ring has momentary engagement with a companion stationary contact.

The assembled relation of the control unit and associated parts is shown in Figures 4 and 5. The shaft 76 is insulated by a sleeve 98 of hard non-conducting material. The rings 93, 94, 95, 95a and 95b are mounted upon a metal sleeve 99 fitted upon the sleeve 98 and functioning as a bus bar, the sleeve 99 being driven from the shaft 76 by one or more diametrically arranged pins 100 of insulating material. The rings are mutually spaced by annular insulating blocks 101. The rings and spacers are keyed to the sleeve 99, being formed on their inner annular faces with alining keyway providing grooves 102 to receive a longitudinal key 103 on the sleeve 99. The shaft 76 is provided with threads 104 adjacent its outer end. The assembled relation of the rings 93, 94, 95, 95a and 95b and the spacers 101 is maintained by washers 105 and 106 which bear against the spacing blocks at the ends of the series. The washer 105 abuts the collar 85 and the washer 106 is held by a clamping nut 107 adjustable upon the threaded shaft portion 104. The washers 105 and 106 also provide end insulations for the sleeve 99 and the key 103 as current conducting parts of the assembly, being made of hard material which insulates these parts from the collar 85 and the bearing 89. The control units will vary in length according to the number of contact rings which they carry, this in turn depending on the number of heddle frames required for the particular weave. For the accommodation of control units of varying lengths the bearing 89 is mounted for longitudinal adjustment upon the shelf 75. Thus the shelf has longitudinal slots 108 to accommodate the shanks of the bolt fastenings 109 by which the bearing 89 is secured, the bolt fastenings being tapped into the foot plate of the bearing which is adjustable to any required position along the length of the slots 108.

The contact rings 94, 95, 95a and 95b severally cooperate with stationary contacts 110 (Figures 4, 5 and 6) and the contact ring 93 cooperates with a stationary contact 111. The contacts 110 and 111 are in the form of leaf spring brushes mounted by screws 113 upon an insulating supporting bar 112 and their projecting portions overhang and bear upon the control element. The bar 112 is secured to supporting insulating brackets 114 by screws 115, the brackets 114 being secured upon the shelf 75 by screws 116. The contact fingers 96, 97, 97a and 97b and the peripheral surface of the ring 93 are flush with the peripheral surfaces of the spacers 101. The spring contacts 110 and 111 each bridge the space between two adjacent spacers 101 whereby the inner faces of the contacts 110 will be engaged by the fingers of the contact rings and the inner face of the contact 111 will always be engaged by the peripheral face of the contact 93.

The circuits for the solenoids which govern the movement of the valves 114 conform to the usual practice and a wiring diagram is therefore unnecessary. In general they include a transformer (not shown) which supplies eight volt current to the solenoids. A convenience outlet 117 is mounted on any desired part, e. g. one of the arms 34, and has its return wire connection grounded to the frame of the loom as indicated diagrammatically at 118 in Figure 1. Each solenoid is also grounded to the frame of the loom as indicated diagrammatically (in respect to the two solenoids of one of the valve organizations) at 119 in Figure 1. The wires which are directly connected to the transformer carry a plug 120 for engagement in the usual manner with the outlet 117. A current feed wire 121 (Figures 1 and 2) extends from the outlet 117 to the contact 111 and wires 122 extend between the several solenoids and corresponding contacts 110. When any of these contacts is engaged by a contact finger of a heddle ring current flows from the transformer through the plug 120, the outlet 117, the wire 121, the contact 111, the contact ring 93, the sleeve 99, the contact ring which has a contact finger in engagement with a contact 110, the particular contact 110 so engaged, the corresponding wire 122 and the solenoid to which that wire is connected, the ground connections, the return wire connection of the outlet 117, the plug 120 and the common return wire back to the transformer.

The wires 121 and 122 are protected by the usual sheathing 123 which is secured by clips 124 to the frame of the loom. In the connection of the wires 121 and 122 to their respective contacts 111 and 110 sleeves 125 (Figure 7) are connected to the wire terminals and are provided with fingers 126 which are held in contacting engagement with the stationary contact fingers 110 and 111 by adjacent screws 113 serving as binding posts.

The contacts 110 are connected in alternation to the upper and lower solenoids which respectively govern the upward and downward movements of the heddle frames. In Figure 4 the contacts 110 are distinguished as U and D to signify their inclusion in the respective circuits of the upper and lower solenoids. In Figure 26 the eight heddle frames are distinguished in the order of their arrangement from the front to the rear of the loom as "1" to "8." Two adjacent U and D contacts 110 are companions for the operation of each heddle frame. When a U contact 110 is engaged by a finger of its corresponding heddle ring the heddle frame is raised and when the companion D contact is so engaged the heddle frame is lowered. In the operative phase shown by Figure 26 the contact finger positions are marked in vertical columns of squares distinguished by the columnar designations U and D which correspond to the designations of the contacts 110 in Figure 4. The relationship of the companion U and D contacts 110 in pairs is indicated in Figure 4 by brackets which subtend the contacts 110 and are designated as "1" to "8" in correspondence with the heddle frame designations on the chart of Figure 26. In like manner the relationship of the heddle rings as paired companions is indicated in Figure 8 by brackets correspondingly designated as "1" to "8."

In general the two companion heddle rings for the operation of any particular heddle frame correspond to the cam of the conventional loom provided for the operation of the same heddle frame, that is to say the number and location of the contact fingers on each ring and the location of the contact fingers of one ring relatively to the contact fingers of the companion ring correspond to the number and relative location of the high and low points of the cam which in the conventional loom operates the corresponding heddle frame. It follows that each two companion heddle rings, in their correspondence to a cam of the conventional loom, are in functional effect a single element for controlling the movements of the corresponding heddle frame just as in the conventional loom the corresponding cam is such a single element. It also follows that the elements constituted by the pairs of companion heddle rings will correspond to the series of cams of the standard loom as set up for the same pattern of weave. It will, accordingly, be understood that the heddle rings in respect to their numbers, the numbers of their contact fingers and their relative locations throughout the series may be set up in a control unit to provide elements for the control of the movements of the heddle frames in respect to any pattern of weave within the range of the more than one hundred patterns required in manufacturing production. The charts of Figures 28 and 30 which correspond schematically to the chart of Figure 26 are added merely as examples of variations in the control unit in the respects above noted, the control unit represented by the chart of Figure 28 producing the pattern of three ply weave shown in Figure 27 and the control unit represented by the chart of Figure 30 producing the pattern of three ply weave shown in Figures 29 and 29a considered conjointly.

Referring to Figures 10 to 16b (which assume a clockwise rotation, indicated by arrows, of the heddle rings as viewed from the right, Figure 8 being considered): The heddle ring contact fingers are shown as variously located in different positions which coincide with fixed points or stations in equidistant relation along the orbital path and conforming in number to the beats of the lay during a cycle of loom operation. For the pattern shown in Figure 25 a cycle of loom operation requires six beats of the lay. Hence there are six stations distinguished in counter-clockwise order in Figures 10 to 16b as A (the contact station), B, C, D, E and F.

The twelve rings 94 comprise six pairs of companions for the operation respectively of six heddle frames. The two rings 95 (Figure 16) are companions for the operation of one heddle frame and have their fingers 97 in offset relation as indicated in Figure 16 by the showing of the fingers of the two rings in full and broken lines respectively. The two rings 95a and 95b (Figures 16a and 16b) are companions for the operation of the remaining heddle frame and also have their fingers in offset relation.

In Figure 26 the stations are designated in a vertical column. The contact finger positions in the operative phase charted are indicated by check marks in squares alining horizontally with station designations and vertically with columnar designations. For example when the finger 96 of the heddle ring 94 for the up movement of the number "1" heddle frame is at station A the finger 96 of the companion ring for the down movement of that heddle frame is at station D, these contact finger positions being shown in Figures 10 and 13 respectively.

For the purpose of effecting the proper relative positioning of the fingers of the heddle rings the keyway provided by the grooves 102 may be considered as a point of reference. The fingers 96 of the heddle rings 94 are severally located in six different positions corresponding to the six stations above identified. In describing the location of the fingers 96 with relation to the point of reference the space intervals between the fixed points or stations may be designated as "steps" and the counting of steps is in the clockwise direction. Thus in Figure 10 the finger 96 is shown at station A. In Figure 11 the finger 96 is five steps removed from the keyway and is shown at station B. In Figures 12, 13, 14 and 15 the fingers 96 are respectively four, three, two and one steps removed and are shown at station C, D, E and F. In Figure 16 the fingers 97 shown in full lines are arranged the first in alinement with the keyway, the second two steps removed and the third four steps removed, the mutual spacing of the fingers being of the distance of two steps. The fingers 97 of the second ring 95 which are shown in broken lines are arranged the first one step removed from the keyway, the second three steps removed and the third five steps removed. In Figure 16a the fingers 97a of the ring 95a are arranged the first at station E, two steps away from the keyway and the second at station B, five steps away from the keyway. In the companion ring 95b shown in Figure 16b the fingers 97b are in alternate or staggered relation to the fingers 97a of the ring 95a, the first finger 97b being located in alinement with the keyway at station A and the second finger 97b being located four steps away from the keyway at station C.

The sequences of heddle frame movements effected by the control unit shown in Figure 8 for weaving belting of the pattern shown in Figure 25 are the same as those produced by the cams of the conventional loom for weaving the same pattern and therefore do not require detail description. The chart of Figure 26 shows, by way of example, one of the six operative phases of the heddle frame movements in the production of such belting. The phase selected is identified by the contact positions of the rings 94 for effecting respectively the movements of the number "1" and number "2" heddle frames, these movements being simultaneously in opposite directions. In the conventional three ply belting the number "1" and number "2" heddle frames effect the weaving of the warp binders B (Figure 25) and each remains in its raised or lowered positions, as the case may be, during three beats of the lay (a half cycle) in which the three weft threads W of a vertical row are laid. At the conclusion of the half cycle the positions of these frames are simultaneously reversed. Thus in the chart of Figure 26, the contact finger 96 of the first heddle ring is indicated as engaging the U contact 110 of the number "1" heddle frame and the contact finger 96 of the fourth heddle ring is indicated as engaging the D contact 110 of the number "2" heddle frame. At the same time the contact finger 96 of the second and third heddle rings are at the positions of station D from which they will move in the clockwise direction through three steps, that is to say through stations C and B to station A, where they will engage the D contact 110 of the number "1" heddle frame and the U contact 110 of the number "2" heddle frame. Thereupon the positions of the heddle frames are reversed, the contact fingers 96 of the first and fourth heddle rings at this time having moved to station D. The remaining heddle rings 94, 95, 95a and 95b effect the weaving of the warp ends as plies X, Y and Z. In producing the conventional three ply weave the heddle frames identified as numbers "3," "4," "7" and "8" in each instance have their movements controlled by heddle rings each having a single contact, namely the heddle rings 94, the sequences of their movements being sufficiently indicated by the chart. The number "5" and number "6" heddle frames have sequential movements in relation to one another and to the other heddle frames such that heddle rings having more than one contact finger (of the forms above explained and corresponding to the cams for the number "5" and "6" heddle frames of the conventional loom) are required, their sequences in relation to one another and to the other heddle frames being also sufficiently indicated by the chart.

The chart of Figure 28 is of the same character as the chart of Figure 26 and sufficiently indicates the form and arrangement of heddle rings required to produce the conventional three ply weave with interlocking warp binders shown in Figure 27. Thus for the production of the pattern of weave shown in Figure 27 the heddle rings for the number "1" and "2" heddle frames will each have two contact fingers mutually spaced and arranged in relation to the point of reference as indicated in the chart. The heddle rings for the number "3," "4," "6," "7" and "8" heddle frames will each have a single contact finger arranged in relation to the point of reference as indicated in the chart and the heddle rings for the number "5" heddle frame will each have three contact fingers arranged in relation to one another as shown in Figure 16 and in relation to the contact fingers of the other rings as shown in the chart.

The pattern of three ply weave shown in Figures 29 and 29a, viewed conjointly, is characterized by interlocking warp ends and interlocking binders and requires ten heddle frames identified on the chart of Figure 30 (which is of the same general character as the chart of Figure 26) as "1" to "10" and twelve stations (fixed points) identified on the chart as "A" to "L." The operative phase indicated in the chart of Figure 30 is that in which a contact finger of the ring for the up movement of the number "5" heddle frame and a contact finger of the ring for the down movement of the number "6" heddle frame are in their contact positions at station A. The number and relative arrangement of the fingers of the several rings conform to the high and low points of the cam tracks of the conventional loom as set up for this well known pattern of weave and are indicated by check marks on the chart. For this particular pattern of weave the rings for the number "1" heddle frame each have one contact finger; the rings for the number "2" heddle frame each have three fingers; the rings for the number "3," "4," "5," "7," "8," "9" and "10" heddle frames each have two fingers; and the rings for the number "6" heddle frame each have four fingers.

The conversion of a loom for a different pattern of weave involves the substitution of a control unit and associated parts fashioned for the new pattern of weave. Of course if the changed pattern of weave requires a greater number of weft threads in a cycle of loom operation the operating gearing for the lay assembly must be changed in accordance with standard practice.

If, for example, a loom be equipped with a control unit for the production of the conventional three ply belting shown in Figure 25 and it be desired to alter the loom to effect the production of the conventional three ply belting with interlocking binders shown in Figure 27 all that is required is the removal, in the manner above explained, of the control unit conforming to the chart of Figure 26 and the substitution of a control unit conforming to the chart of Figure 28. A change of this kind may be effected by a single workman within a period of a few minutes. In like manner if it be desired to alter the same loom to effect the production of the three ply belting shown in Figures 29 and 29a, viewed conjointly, the control unit conforming to the chart of Figure 30 together with a bar 112 having twenty contacts 110 is substituted, the loom alteration otherwise requiring merely the addition of two heddle frames and their associated harness features, two fluid pressure motors 18, each with its associated valve and solenoid organizations above described, and the appropriate alteration of the gearing for the lay assembly. A change of this kind may be effected by a single workman within a period of time of the order of two hours.

Referring to Figures 31 to 47:

These figures illustrate an embodiment of the invention in a structural combination of electrical character which includes all the features above described and additional features for use in split shed weaving. It is believed that this embodiment will be more readily understood by first pointing out the differences, to the extent here pertinent, in certain operative phases of open and split shed weaving, it being understood that both types of weaving are available for the same structural patterns. The operative differences pertinent for consideration are (1) that whereas in open shed weaving the heddle frames are moved continuously through a full stroke and their movements are therefore initiated from their uppermost or lowermost positions, in split shed weaving the movements of the heddle frames are initiated from a median position and the heddle frames have pauses at such position and at their extreme positions and (2) that whereas in open shed weaving each heddle frame remains in an extreme position for the number of beats of the lay required by the particular pattern of weave, in the split shed weaving of the same pattern each heddle frame reciprocates for each beat of the lay between its median position and the same extreme position for the like number of beats, the heddle frame thereupon being moved from its median position to its opposite extreme position and for the rest of the cycle having its reciprocations between these two latter positions, the cycle being repeated in this manner throughout the operation of the loom. For example, in the three ply pattern of weave shown in Figure 25 and in respect to open shed weaving, the number "1" and number "2" heddle frames for the weaving of the warp binders B remain in their extreme positions, opposed in the two heddle frames, for three beats of the lay whereupon their positions are simultaneously reversed in continuous movements whereas in the split shed weaving of the same pattern the number "1" and number "2" heddle frames each reciprocate for each beat of the lay during a half cycle of three beats between their median positions and the same extreme positions which they respectively occupy in opposed relation and, returning to their median positions upon the completion of each half cycle, are moved thence to their opposite extreme and opposed positions between which and their median positions they each reciprocate for each beat of the lay during the succeeding half cycle of three beats, whereupon, returning to their median positions, the full cycle is repeated throughout the period of loom operation.

The control unit for split shed weaving has the same structural characteristics (shown in Figure 5) as the control unit for open shed weaving and, for the same pattern of weave, embodies the same contact rings with their contact fingers in the same relation. The control unit selected for illustration in Figure 38 produces the same pattern of weave as the control unit shown in Figure 8, namely the pattern shown in Figure 25, and embodies the line contact ring 93 and the heddle rings 94, 95, 95a and 95b in the relative positions above described and as shown by the chart of Figure 26. For clarity of illustration and description the heddle rings are again shown with the same reference character designations in Figures 39, 40, 41 and 42 in connection with the control unit shown in Figure 38.

The operation of each fluid pressure motor 18 to return a corresponding heddle frame from its median position to one of its extreme positions is governed by an additional solenoid operated valve which may be called a "return valve." Energizations of the solenoids which operate the return valves are controlled by rings 127 (Figure 43) which may be called "heddle return rings" and, for the split shed weaving of the particular pattern selected as an example, are each provided with six contact fingers 128 equally spaced. Similarly to the heddle rings each heddle return ring 127 is provided with a keyway forming groove 102.

In order to effect the movements of the heddle frames from their extreme positions to their median or neutral positions two fluid pressures motors 129 and 130 are provided. These, which may be called "neutralizing motors," are similar in all structural respects to the motors 18, their controlling valve organizations and solenoid valve operating features being of the construction shown in Figure 23. In this construction the valves are similar in all respects to the valves 41 and are distinguished as 41a (Figure 47), the floating solenoid operating pistons being devices for moving the valves 41a between their extreme positions. The motors 129 and 130 respectively effect the movements of the heddle frames from their upper and lower positions. The solenoids of the valve organizations associated with the motors 129 and 130 are under the control of two contact rings 131 and 132 (the ring 132 being shown in side elevation in Figure 44) which may be called "neutralizing rings" and are of the same form as the heddle return rings 127, having in each instance six equally spaced contact fingers 133 and 134 respectively. The neutralizing rings 131 and 132 are mounted upon the shaft 76 of the control unit in the same way as the other contact rings and are preferably located at the outer end of the unit and beyond the line ring 93. Additional spacing blocks 101 are provided to separate the rings 127, 131 and 132 from adjacent rings.

In Figure 38 the companion heddle rings 94 which control the locations of a particular heddle frame in its extreme positions (the companion number "1" and "2" heddle frames being selected as examples) are distinguished by the index letters U and D, the heddle rings 94U controlling the raised or "up" positions of the corresponding heddle frames and the heddle rings 94D controling their lowered or "down" positions. Two companion heddle return rings 127, operative in alternation, are provided in functional association with each of the two companion heddle rings and are distinguished in Figure 38 by the index letters X and Y. These companion heddle return rings control in the manner later to be described in detail the operation of the "return valves" above referred to, the ring 127X effecting one particular operation of the corresponding return valve and the companion ring 127Y effecting the other particular operation of such valve. Thus in Figure 38, counting from left to right, the first and third rings are the 94U and 94D heddle rings for the number "1" heddle frame and the second and fourth rings are their functionally associated 127X and 127Y heddle return rings. The heddle return ring 127X governs that operation of the corresponding return valve which causes the number "1" heddle frame to be moved from its median position to an extreme position and the heddle return ring 127Y governs the second operation of that return valve, namely that operation in which air is directed to the piston of the corresponding fluid pressure motor to return the number "1" heddle frame from its particular extreme position back to its median position. In like manner the fifth and seventh rings are the 94U and 94D heddle rings for the number "2" heddle frame and the sixth and eighth rings are their functionally associated 127X and 127Y heddle return rings, similarly governing the operations of the corresponding return valve. The operational sequences of the companion 94U and 94D heddle rings, their functionally associated 127X and 127Y heddle return rings and the neutralizing rings 131 and 132 will be traced in connection with the operations of the companion number "1" and number "2" heddle frames in the detail description to follow.

The loom for closed shed weaving includes the battery of fluid pressure motors 18 previously described, the motor parts being sufficiently shown in Figure 35 wherein they are designated by the same reference numerals. The controlling valve organization and the solenoid valve operating features are shown in detail in Figures 34 to 37 and include the parts shown in Figure 23, these being designated by the same reference numerals. The valve organization differs however from the construction shown in Figure 23 in that it includes an additional feature, namely the "return valve" above mentioned in relation to which the valve 41 functions as a "master valve." The return valve 135 is preferably mounted for sliding movement in the direction of its longitudinal axis and is solenoid operated, having two positions which are shown respectively in Figures 35 and 36. As shown in Figures 34 and 35 the valve 135 is positioned to cut off the supply of air to the cylinder 20 of its associated fluid pressure motor and to effect the by-passing of the air from one to the other end of the cylinder. As shown in Figure 36 the valve 135 is positioned to permit the movement of air to and from the cylinder of its associated fluid pressure motor, the particular air-flow paths being determined by the position of the master valve 41.

The valve 135 and its associated solenoids 136 and 137 are mounted in a casing 138, preferably of rectangular cross section, which is arranged between the block 56 and the outer head 57 of the associated fluid motor cylinder 20 and is secured in gasket sealed relation to these parts. The valve 135 is preferably horizontally arranged and movable. The casing 138 is formed with an opening 139 which provides a chamber for the valve 135, the opening 139 terminating short of the ends of the casing and extending between end recesses 140 of greater diameter in which the solenoids 136 and 137 are fitted, these solenoids and their housings 141 being confined between shoulders 142 provided by the bases of the recesses 140 and the end heads 143 of the casing. The bases 144 of the solenoid housings 141 overhang the ends of the valve chamber 139 and provide shoulders which serve as stops for limiting the movements of the valve 135. The solenoid armatures 145 are carried by the valve 135 and project in coaxial relation from its ends. The armatures 145 are of less diameter than the valve and project into, and are movable within, the openings 146 delimited by the cylindrical walls of the solenoid housings 141. The slidable movements of the valve 135 are limited by the engagement of its ends with the limiting stop shoulders provided by the bases 144 of the solenoid housings 141. As a matter of manufacturing convenience the valve 135 is preferably of cylindrical outline and its chamber 139 is of circular cross section, the cylindrical wall of the chamber 139 serving to confine the valve 135 for axial movement and to guide it in such movements. When the valve 135 is slidably mounted, as preferred, it is necessary that it be held against turning about its longitudinal axis. In the construction shown, wherein the valve is of cylindrical outline, this is accomplished by the provision of a longitudinal key 147 in one or both of the openings 146, the key engaging slidably in a longitudinal groove 148 formed in the corresponding armature 145.

The casing 138 is provided at one side of the valve 135 with upper and lower passages 62a and 63a which aline and communicate with the passages 62 and 63 in the block 56. At the opposite side of the valve the casing 138 is provided with passages 59a and 60a which aline and communicate with the passages 59 and 60 in the cylinder head 57. The valve 135 is provided with a vertical channel 149 and in the position shown in Figures 34 and 35 establishes communication by means of the channel 149 between the passages 59a and 60a and simultaneously closes the inner ends of the passages 62a and 63a. The valve 135 is also provided at one side of the channel 149 with upper and lower horizontal channels 150 and 151, the side walls of which are in common diametrical planes. When the valve 135 is in the position shown in Figure 36 the channel 149 is located beyond the passages 59a and 60a and thereby the communication between these passages is cut off. At the same time the valve establishes communication by means of the channel 150 between the passages 62a and 59a and by means of the channel 151 between the passages 63a and 60a.

In the position of the valve 135 shown in Figure 35 the air within the cylinder 20 of the associated fluid pressure motor is by-passed from one end to the other, its path in either direction including the passages 59a, 149 and 60a. In the position of the valve 135 shown in Figure 36 air is supplied to one end of the motor cylinder and is exhausted from its opposite end. The air flow paths are essentially the same as above described with reference to Figure 23 except that they include the association of passages 59a, 150 and 62a and 60a, 151 and 63a.

In Figure 35, as in Figure 23, the valve 41 is shown in its upper position whereby air is admitted to the left end of the cylinder 20 and is simultaneously exhausted from its right end. With the valve 41 in its lower position air is admitted to the right end of the cylinder 20 and is simultaneously exhausted from its left end.

The valve 135 is moved to the position shown in Figures 34 and 35 by the solenoid 136 and to the position shown in Figure 36 by the solenoid 137. The arrangement of the channels 149, 150 and 151 in relation to the length of the valve stroke is such that the channel 149 in its active position as shown in Figures 34 and 35 extends across a central transverse plane of the casing 138 and the channels 150 and 151 in their active positions as shown in Figure 36 extend across the same transverse plane, this being indicated in Figure 34 by the line 35—35.

It will be noted that the valve 135, the associated valve 41 and the valve casing structure constitute a valve organization operable sequentially in two phases, viz., first to establish selectively either of the air flow paths for the operation of the corresponding motor 18 and second to vent air from that end of the cylinder of the motor 18 toward which the piston 39 is moving in consequence of the movement of the associated lever 7 to its median position whereby such movement of the lever 7 is unopposed by air in the cylinder of the associated motor 18.

The pistons of the fluid pressure motors 129 and 130 have their active strokes simultaneously in opposite directions and thereby cause the heddle frames to be moved from their extreme to their median positions. During the return piston strokes, also simultaneously in opposite directions, the heddle frames are moved by their corresponding fluid pressure motor 18 to their particular extreme positions which accord with the particular phase of the loom cycle.

The valves 41a are simultaneously moved in opposite positions and hence prescribe the coordinated opposed movements of the pistons of the motors 129 and 130. The movements of the valves 41a are responsive to the opposed movements of the floating pistons 45 which, in each instance, are under the control of opposed solenoids as previously explained. In essence the valves 41a in their coordinated opposite movements constitute a valve means operable to establish contemporaneous air flow paths for the admission of air to one end of each of the cylinders of the motors 129 and 130 and the exhaust of air from its opposite end and also operable in two phases in which the air flow paths of the two cylinders are simultaneously reversed. The floating pistons for the operation of the valves 41a are, of course, simultaneously in opposite positions and, conjointly, constitute a movably mounted actuating means in operative association with the valve means for effecting its sequential operations in its two phases.

The return valve 135 is moved to the position shown in Figures 34 and 35 at the instant when the active strokes of the pistons of the motors 129 and 130 are to begin and there remains momentarily after the active strokes have been completed. This position of the return valve effects the bypassing of the air from one end of a cylinder 20 to the other as above described, and is necessary in order that the pistons of the motors 129 and 130 may move through their active strokes. The return valve 135 is moved to its second position shown in Figure 36 at the instant when the return strokes of the pistons of the motors 129 and 130 are to begin and there remains momentarily until the return strokes have been completed. Thereby the operational air-flow paths of the motors 18 are completed as above described as a consequence of which the heddle frames are moved to their extreme positions by the pistons of the motors 18, the direction of heddle frame movements, that is to say the particular extreme positions to which the heddle frames are moved, depending on the particular positions of the valves 41. In the various patterns of weaves a valve 41 may be required to remain in one position during a number of movements of the corresponding heddle frame from and back to the corresponding extreme position. The particular position of a valve 41 is prescribed by one of the companion heddle rings which controls the operative movements of a corresponding heddle frame. The duration of a valve 41 in a particular position is prescribed by the particular spacing of the successively operating contacts of the companion heddle rings. Hence the relative positions of the valves 41, as a series, are prescribed by the heddle rings as a series and in accordance with their forms in respect to the number and relative positions of their contact fingers. For example, with reference to the number "1" heddle frames, the pattern of weave shown in Figure 25 and the form and arrangement of the controlling heddle rings 94 as indicated by the chart of Figure 26, the valve 41, functioning as a master valve, will remain in either of its positions during the laying of a vertical tier of three weft threads, that is to say for three complete reciprocations of the number "1" and "2" heddle frames between their median and their respective and opposed extreme positions.

Since the active and return strokes of the pistons of the motors 129 and 130 are respectively simultaneous the valves 135 are all simultaneously in one or the other of their two positions. Thereby they simultaneously act in the operative capacity determined by their particular position.

The uprights 23 (Figure 32) extend upward beyond the arms 34 and carry a shelf 152 of angle cross section including a vertical flange 153 for the direct support of the motors 129 and 130. The inner heads of these motors are provided with centrally located externally threaded axial tubular extensions 154 which project through openings in the flange 153 and carry nuts 155 that bear with clamping pressure against the inner face of the flange 153 and secure the motors 129 and 130 in position. The piston rods of the motors 129 and 130 have extensions 156 and 157 respectively which project through the tubular extensions 154 of the inner heads of the motor cylinders and carry clevises 158 and 159 respectively, these being secured by jamb nuts 160. The clevises 158 and 159 are connected to cross bars 161 and 162 respectively (Figure 33) in opposed relation and which extend across all the levers 7 in adjacency to their opposite edge faces. The cross bar 162 is provided with a lug 163 connected to the clevis 159 and the cross bar 161 is provided with a horizontal outwardly projecting post 164 connected to the clevis 158. The cross bars approach one another on their simultaneous active strokes and move the levers 7 to their median positions. On their simultaneous return strokes the cross bars mutually recede in a conditioning operation in respect to the fluid pressure motors 18 to enable them to move the levers 7, without opposition by the motors 129 and 130, to their extreme positions as determined by the positions of the several valves 41.

The cross bars 161 and 162 are supported in vertical planes, normal to the longitudinal axis of the piston rod extensions 156 and 157, by horizontal rods 165 located in a common horizontal plane. The rods 165 extend between and are supported by the flange 153 and a bar 166 located above the beam 32 and carried by the same side frame 6. The rods 165 are held against movement by heads 167 which bear against the outer face of the flange 153 and by nuts 168 which bear against the outer face of the bar 166. In Figure 31, and in broken lines in Figure 32, the cross bars are shown as having completed their active strokes in which the levers 7 are in their median positions (shown in broken lines in Figure 32); and in Figure 32 the bars 161 and 162 are shown in full lines at the limits of their return strokes. The bars 161 and 162 are provided at their ends with sleeves 169 which project toward the flange 153 and the bar 166 and are slidably mounted upon the rods 165, these sleeves functioning as supporting guides for the bars 161 and 162 and also by abutting engagement with the flange 153 and the bar 166 serving to limit their return strokes.

The line ring 93, the several heddle rings 94, 95, 95a and 95b, the several return rings 127 and the neutralizing rings 131 and 132 cooperate with stationary contact fingers carried by an insulating supporting bar 112a mounted similarly to the bar 112 upon the supporting brackets 114. The contact 111 for the line ring and the contacts 110 for the heddle rings are provided as in the construction previously described and are similarly secured upon the upper face of the bar 112a from which they project in overhanging relation to the control unit, the contacts 110 being distinguished by the index letters U and D respectively as those which control the up and down movements of the heddle frames.

In the loom for split shed weaving the stationary contacts are provided in upper and lower series, the contacts 110 and 111 being those of the upper series. The contacts of the lower series are of similar form and are secured upon the lower face of the bar 112a from which they project under the control unit. The lower series contacts 170 cooperate with the heddle return rings 127 and the lower series contacts 171 and 172 respectively cooperate with the neutralizing rings 131 and 132.

As above pointed out two of the heddle return rings distinguished as 127X and 127Y cooperate with the companion heddle rings of each pair provided for controlling the operations of a particular heddle frame. Thus in the loom for split shed weaving a group of four contact rings, namely a U heddle ring, a D heddle ring, an X heddle return ring and a Y heddle return ring control the operation of a corresponding heddle frame. In Figure 38 the several groups are indicated by brackets designated as "1" to "8" in the order of their correspondence to the heddle frames "1" to "8." In this construction the four contact rings of a group, as companions, correspond functionally to a cam of the conventional loom as set up for split shed weaving and are therefore, in functional effect, a single element for controlling the movements of the corresponding heddle frame just as in the conventional loom the corresponding cam is such a single element. The neutralizing rings 131 and 132 are also companions and in functional effect constitute a single element for the control of the coordinated operations of the motors 129 and 130.

The operational sequences of the companion heddle rings, their functionally associated heddle return rings 127X and 127Y and the neutralizing rings 131 and 132 will sufficiently appear from a detail description limited to the movements of the companion number "1" and "2" heddle frames. These movements and the time lags between them are shown by the diagram of Figure 46, the number "1" and "2" heddle frames being respectively represented by solid and broken vertical lines and their movements being in the directions of the arrows. The time lags or rests between their movements are represented by horizontal lines H, I, J, K, L, M, N, O, P, Q, R and S.

At the beginning of a cycle of loom operation the number "1" and "2" heddle frames are in their median positions. With the valves 135 in their cut-off and by-passing positions as shown in Figure 35 (to which they were moved at the completion of the previous cycle) the contact fingers of the 94U heddle ring for the number "1" heddle frame and the 94D heddle ring for the number "2" heddle frame simultaneously make contact engagements at station A with the result that the valves 41 of the fluid pressure motors 18 for the number "1" and number "2" heddle frames are simultaneously moved to their upper and lower positions respectively in which they function as master valves. This is a conditioning operation in respect to the particular air flow paths required for the operations of the fluid pressure motors 18. This positioning of the valves 41 is followed virtually instantly by two operations simultaneously performed, viz.: (1) the simultaneous movements of the pistons of the motors 129 and 130 on their return strokes, thereby to move the bars 161 and 162 away from one another to the positions shown in full lines in Figure 32 and (2) the movement of the valves 135 of the motors 18 from the position shown in Figure 35 to the position shown in Figure 36, thereby to complete the air flow paths required for the operations of the fluid pressure motors 18. In consequence of these operations the fluid pressure motors 18 simultaneously cause the movements of the number "1" and "2" heddle frames at the beginning of a cycle of loom operation to their respective upper and lower positions.

The described initial positioning of the valves 41 results from the simultaneous contact engagement at station A of the fingers of the 94U heddle ring for the number "1" heddle frame and the 94D heddle ring for the number "2" heddle frame, these being shown in Figure 38 (counting from left to right) as the first and seventh contact rings; the movements of the pistons of the motors 129 and 130 on their return strokes result from the contact engagement of a finger of the ring 132 with the associated contact 171; and the movements of the valves 135 to the position of Figure 36 result from the simultaneous engagement of fingers of the heddle return rings 127X (the second and sixth contact rings) with the associated contacts 170.

The heddle return rings 127X and 127Y make their contacts in alternation and therefore their contact fingers are mutually offset. This is shown in Figure 43 wherein the contact fingers of a ring of one series (X or Y) are shown in full lines and the contact fingers of a ring of the other series are shown in broken lines. The two neutralizing rings 131 and 132 in like manner make their contacts in alternation and their fingers are similarly offset as shown in Figure 44. The distance by which the contact fingers of the X and Y series of the rings 127 and of the rings 131 and 132 are offset is the same in all cases and determines the time lag or dwell of the heddle frames in any of their three positions, namely raised, median or lowered. The heddle frame movement phases and time lags shown in Figure 46 are exactly the same as in the standard loom for split shed weaving wherein the heddle frame operating levers are directly operated by cams.

The contact fingers of the rings 127, 131 and 132 make their contact engagements at a fixed point which may be identified as G (Figure 44) and is suitably located, from a timing standpoint, with relation to the heddle ring contact finger engagements at Station A. The intervals between the contact engagements of successive offset contact fingers at the point G determine the time lags between the successive movements of each heddle frame. The number "1" and "2" heddle frames having been initially moved at the beginning of a cycle of loom operation to their respective upper and lower positions in the manner above explained remain in such positions during the time lag H (Figure 46) determined by the interval between the engagement of contact fingers of the rings 127X and 132 at the point G and the immediately succeeding engagement of contact fingers of the rings 127Y and 131 at this point. The contact engagements of fingers of the rings 127Y result in the movement of the valves 135 from the position shown in Figure 36 to the position shown in Figure 35 and the simultaneous contact engagement of a finger of the ring 131 results in the movements of the pistons of the motors 129 and 130 on their active strokes. This operative phase is assumed by the diagram of Figure 47, later to be described in detail. Thereby the bars 161 and 162 are moved toward one another to the positions shown in broken lines in Figure 32 and bring the levers 7 to their median position also shown in broken lines in Figure 32, all of the heddle frames being thereby moved to their median positions, in which they remain during the time lag I. The succeeding contact engagement of a finger of the ring 132 results in the movements of the pistons of the motors 129 and 130 on their return strokes in which the bars 161 and 162 are brought back to the positions shown in full lines in Figure 32. The succeeding contact engagements of fingers of the rings 127X are simultaneous with the contact engagement of a finger of the ring 132 and result in the movement of the valves 135 from the position of Figure 35 to the position of Figure 36 whereupon (the valves 41 of the motors 18 for the number "1" and "2" heddle frames remaining in their respective upper and lower positions) the number "1" and "2" heddle frames are moved back to their respective upper and lower positions in the manner above described and remain in such positions during the time lag J. Three reciprocations of the number "1" and "2" heddle frames between their respective upper and lower positions and their median positions are effected in this manner, the time lags between successive movements of the heddle frames being indicated as H, I, J, K, L and M. These three reciprocations ending at the time lag M constitute a half cycle of loom operation during which three weft threads W of a vertical tier are laid and beaten into position in the usual manner.

During the time lag M the contact fingers of the 94D heddle ring for the number "1" heddle frame and the 94U heddle ring for the number "2" heddle frame simultaneously make contact engagements at Station A with the result that the valves 41 of the fluid pressure motors 18 for the number "1" and "2" heddle frames are simultaneously moved in a conditioning operation to their lower and upper positions respectively in which they again function as master valves. Thereby upon the completion of the time lag M the number "1" heddle frame is moved to its lower position and the number "2" heddle frame is moved to its upper position. Three reciprocations of the number "1" and "2" heddle frames between their respective lower and upper positions and their median positions which constitute the remaining half cycle of loom operation (during which three weft threads W of a succeeding tier are laid and beaten into position) are effected in the manner above described, the time lags during the second half cycle being indicated in Figure 6 as N, O, P, Q, R and S.

The time lag S marks the end of the cycle of loom operation above described and identified on the diagram of Figure 46 as "1st cycle." During the lag S the contact fingers of the 94U heddle ring for the number "1" heddle frame and the contact fingers of the 94D heddle ring for the number "2" heddle frame simultaneously make contact engagements at station A with the result that the valves 41 of the fluid pressure motors 18 for the number "1" and number "2" heddle frames are simultaneously moved in a conditioning operation to their upper and lower positions whereupon the succeeding cycle of loom operation is effected in the manner described, this cycle being identified in the diagram of Figure 46 as "2nd cycle."

In the example described a cycle of loom operation involves the laying of six weft threads in two vertical tiers of three each as above explained. Thereby a revolution of the control unit may be considered as encompassing the six equidistant fixed points (stations) identified as A to F in Figures 39 to 42 and similarly identified on the chart of Figure 26. Considering the heddle rings as a series the contact fingers will be variously located at each of the six stations. Hence in a single revolution of the control unit there will be six successive contact engagements at station A at equal time intervals. This fact dictates six equidistant contact fingers on the heddle return rings 127 and the neutralizing rings 131 and 132 for the reason that their contact operations must be made in correlation to each of the six successive contact engagements at station A of the fingers of the series of heddle rings. In sum, the number of contact fingers provided on the rings 127, 131 and 132 and their equal spacing is dictated by and corresponds to the number and spacing of stations through which the contact fingers of the several heddle rings are movable. As a further example the chart of Figure 30 conforms to a control unit in which a cycle of loom operation for weaving the pattern shown in Figures 29 and 29a involves the laying of twelve weft threads in four vertical rows, each of three weft threads, and the heddle ring contact fingers are therefore movable through twelve equidistant stations A to L. Hence in the corresponding control unit the rings 127X and 127Y are each provided with twelve equidistant contact fingers offset in the manner above explained and the rings 131 and 132 are each provided with twelve equidistant contact fingers similarly offset.

The relationship of the various operating parts in connection with the heddle frame movements as above described and as shown by the chart of Figure 46 will sufficiently appear from the diagram of Figure 47. This diagram is limited to that phase of operation in which the motors 129 and 130 effect the movements of the number "1" and "2" heddle frames from their respective upper and lower positions to their median positions. Since the complementary phase of operation involves merely a reversal of the relation of the parts it will be sufficiently clear from the diagram.

In the diagram the lever 7 which has its lower arm shown at the left is assumed to be connected to the number "1" heddle frame and to be moving it from its upper position and the lever 7 which has its lower arm shown at the right is assumed to be connected to the number "2" heddle frame and to be moving it from its lower position. The pistons of the motors 129 and 130 are assumed to be on their active strokes, the bars 161 and 162 moving toward one another as indicated by the arrows and the levers 7 to be approaching their median positions. For the purpose of simplicity the showing of the diagram is limited to the motor 18 for the number "2" heddle frame, the piston 39 being assumed as moving to the left (the piston of the motor 18 for the number "1" heddle frame being in simultaneous motion to the right). For clarity of illustration the motor 129 is shown as above the motor 130 and the valve casings 43 and 138 are shown as extending in the same direction, thereby to enable a clearer showing of the wiring between the several stationary contacts and the solenoids of the fluid pressure motors. The diagram holds generally for all the movements of the heddle frames to their median positions but, with reference to the diagram of Figure 46, is based specifically upon the first upward movement of the number "2" heddle frame in the first half of a cycle, that is to say that movement of the number "2" heddle frame at the end of which the time lag I commences. The diagram assumes that the rotation of the contact rings is clockwise.

The stationary contact 171 associated with the neutralizing ring 131 is connected to a wire 173 which by a branch wire 174 is connected to the upper valve operating solenoid of the motor 129 and by another branch wire 175 is connected to the lower valve operating solenoid of the motor 130. The diagram shows the engagement of a finger of the ring 131 with the contact 171 at the point G (Figure 44) and therefore assumes that the valves 41a of the motors 129 and 130 have been moved to their respective upper and lower positions. The stationary contact 172 associated with the neutralizing ring 132 is connected to a wire 176 which by a branch wire 177 is connected to the lower valve operating solenoid of the motor 129 and by another branch wire 178 is connected to the upper valve operating solenoid of the motor 130. The diagram shows that the contact 172 is not in engagement with a finger of the ring 132 and assumes that upon the movement of the engaging finger of the ring 131 beyond the point G and out of engagement with the contact 171 the succeeding operation will be the engagement of a finger of the ring 132, after the determined time interval, with the contact 172, thereby to reverse the positions of the valves 41a, that is to say to cause the movements of the valves 41a of the motors 129 and 130 to their lower and upper positions respectively at which time the pistons of the motors 129 and 130 will move on their return strokes, moving the bars 161 and 162 away from one another to permit the levers 7 to be moved by their associated fluid pressure motors 18 to their respective extreme positions. The contacts 110U and 110D in association with the respective heddle rings 94U and 94D are respectively connected by wires 179 and 180 to the upper and lower solenoids within the valve casing 43 associated with the corresponding fluid pressure motor 18, i. e. as shown in the diagram, the motor for operating the lever 7 which effects the movements of the number "2" heddle frame and has its lower arm shown at the right. The stationary contact 170 associated with the heddle return ring 127Y is connected by a wire 181 to that solenoid within the casing 138 which effects the movement of the valve 135 to its cut-off and by-passing position as shown in Figure 35. The stationary contact 170 associated with the heddle return ring 127X is connected by a wire 182 to that solenoid within the casing 138 which effects the movement of the valve 135 to the position shown in Figure 36 in which the air flow paths of the fluid pressure motor 18 are established. The diagram shows a contact finger of the ring 127Y in engagement with the associated stationary contact 170 wherefore the valve 135 has been moved to the cut-off and by-passing position shown in Figure 35. This is sufficiently indicated by the arrows applied to the motor 18 which show that the air in the cylinder space at the left of its piston 39 is being by-passed to the cylinder space at the right of the piston. The diagram shows that the contact 170 associated with the heddle return ring 127X is not in engagement with a finger of that ring and assumes that upon the movement of the engaging finger of the ring 127Y beyond the point G and out of engagement with the associated contact 170 the succeeding operation will be the engagement of a finger of the ring 127X, after the determined time interval, with the associated contact 170, thereby to reverse the position of the valve 135, that is to say to cause its movement to the position shown in Figure 36 in which it establishes the air flow paths of the fluid pressure motor 18.

The diagram assumes that the contact finger of the heddle ring 94D for the number "2" heddle frame has just had its engagement at station A with the associated contact 110D and has moved beyond that station, and that the valve 41 of the fluid pressure motor 18 has thereby been moved to, and remains in, its lower position, this movement of the valve 41 being a conditioning operation as above described. The diagram also assumes that the contact finger of the heddle ring 94U for the number "2" heddle frame is moving to station A for engagement with its associated contact 110U and that such engagement will take place, in the example assumed, upon the completion of a half cycle of loom operation, that is to say during the time lag M (Figure 46) whereupon the valve 41 of the motor 18 will be moved in a succeeding conditioning operation to its upper position in which it will remain during the succeeding half cycle of loom operation. The diagram shows the neutralizing ring 131 and the heddle return ring 127Y as simultaneously operating in the same phase, that is to say with contact fingers in engagement with the respective associated contacts 171 and 170. The diagram also shows the neutralizing ring 132 and the heddle return ring 127X as simultaneously in the same phase of movement, that is to say in movement to establish, after the determined time interval, the succeeding operative phase which will be the simultaneous engagement at point G of a contact finger of the ring 132 with the associated contact 172 and of a finger of the ring 127X with the associated contact 170.

With the parts in the positions and relations shown in the diagram and above described air is admitted simultaneously to the left and right ends respectively of the cylinders of the motors 129 and 130 and drives their pistons simultaneously to the right and left respectively, thereby to cause the movements of the levers 7 to their median positions; and at the same time air is being by-passed from end to end of the cylinders of the motors 18, this by-passing in the motor 18 shown in the diagram being from the left to the right end of its cylinder.

It will be obvious from the diagram and from the preceding description that in the succeeding phases of operation involving the simultaneous engagements at point G of a contact finger of the ring 132 with the associated stationary contact 172 and of a contact finger of the ring 127X with its associated stationary contact 170 the paths of air flow for the motors 129 and 130 will be reversed with the result that the bars 161 and 162 will be moved away from one another and the motors 18 will be operated to cause the movements of the levers 7 to their extreme positions which, in the phase assumed by the diagram (the valve 41 of the motor 18 shown in the diagram remaining in its lower position), will result in the movement of the heddle frames "1" and "2" at the end of the time lag I to their respective upper and lower positions. When the contact finger of the heddle ring 94U shown in the diagram reaches station A during the time lag M (Figure 46) and engages the associated contact 110U the valve 41 of the motor 18 shown in the diagram will be moved in a succeeding conditioning operation to its upper position and the contact finger 94D for the number "2" heddle frame will be at station D. The contact engagement of the finger of the heddle ring 94U shown in the diagram during the time lag M is followed virtually instantly by the engagement of a finger of the neutralizing ring 132 with its associated contact 172 whereby the pistons of the motors 129 and 130 are moved on their return strokes and by the simultaneous engagement of a finger of the heddle return ring 127X with its associated contact 170 whereby the valve 135 is moved to the positions of Figure 36. Thereupon the number "2" heddle frame is moved to its upper position, the various parts shown in the diagram then operating sequentially in the manner previously described to effect three complete reciprocations of the number "2" heddle frame between its median and upper positions with the last reciprocation terminating at the beginning of the time lag S which is followed by the next cycle of loom operation. As will be apparent from the previous description simultaneously with the contact engagement at station A of the finger of the heddle ring 94U for the number "2" heddle frame the finger of the heddle ring 94D for the number "1" heddle frame will make contact at station A (the finger of the companion 94U heddle ring, then being at station D) whereby the valve 41 of the motor 18 for the number "1" heddle frame will be moved in a succeeding conditioning operation to its lower position and the parts will operate in the manner and sequences shown in the diagram to effect three complete reciprocations of the number "1" heddle frame between its median and lower positions, the last reciprocation also terminating at the beginning of the time lag S.

It will be noted that the solenoid operated floating piston for the operation of a valve 41 and the solenoids for the operation of the associated valve 135 functionally constitute a device operative by movements for effecting the operation of the valve organization associated with a motor 18 in its sequential phases as above described and that the device so constituted is under the control of an element of the control unit which is composed of a group of four functionally associated contact rings 94U, 94D, 127X and 127Y, these contact rings as shown in Figure 47 being the rings of group "2" as shown in Figure 38.

Referring to Figures 48 to 59:

These figures illustrate a modification in which the operations of the valves for the fluid pressure motors are effected mechanically by a series of cams incorporated in the control unit. In the form selected for illustration the control unit 73a is designed for the weaving of belting of the pattern shown in Figure 25 and the heddle frame movements are the same as those produced by the control unit 73 (Figure 8) which conforms to the chart shown in Figure 26. It will, however, be understood that the control unit may be designed, by selection of the various forms, number and relative positions of the cams for the weaving of any structural pattern that may be required.

The shaft 183 of the control unit is driven by the reduction gearing shown in Figure 5 in the same manner as the shaft 76 of the control unit 73 (Figures 5 and 8). For the weaving of belting of the pattern shown in Figure 25 the control unit includes eight cams 184, 185, 186, 187, 188, 189, 190 and 191 mounted on the shaft 183 in the order of their numerical designations and of their sequences as shown in Figures 52 to 59 inclusive. The cams each have an opening 192 through which the shaft 183 extends. The openings 192 are interrupted by alining grooves 102a which provide a keyway to receive a longitudinally extending key 103a carried by the shaft 183. The grooves 102a correspond to the grooves 102 of the heddle rings shown in Figure 10 to 16b in respect to the utility of the keyway as a point of reference to enable the proper relative positioning of the cams. The proper mutual spacing of the cams is effected by sleeves 193 mounted on the shaft 183 and having alining grooves 103b (Figure 49) to accommodate the key 103a. The shaft 183 is provided at its inner end with a terminal collar 86a similar to the collar 86 on the shaft 76 and at its opposite end carries a clamping nut 107a similar to the nut 107 on the shaft 76. The cams as a series are held against longitudinal movement on the shaft 183 by short end spacing sleeves 194 similar in form to the sleeves 193, one sleeve 194 being arranged between the cam 184 and the collar 86a and the other being arranged between the cam 191 and the clamping nut 107a. The control unit 73a is mounted on a horizontal shelf 75a in the same manner that the control unit 73 is mounted on the shelf 75. When the pattern of weave is to be changed the control unit 73a which has been in use may be removed and a control unit 73a organized for the changed pattern of weave may be substituted, such removal and substitution being effected in the manner previously described in connection with the control unit 73.

For the operation of the levers 7 the loom includes fluid pressure motors 18a (Figure 49) mounted as a battery similarly to the motor 18. The valve organization for controlling the operations of the pistons 39a of the motors 18a is mounted on the shelf 75a in adjacency to the control unit 73a. Because of the space which it requires the control unit 73a is not as compact as the control unit 73 shown in Figure 8. Therefore, if a particular pattern of weave should require a number of cams in excess of the available space at one side of the loom two control units are required, one to be mounted at each side of the loom with certain of the cams incorporated in one unit and the remainder in the other. It will of course be understood that when two control units are thus required they will operate in timed relation whereby the cams will function in the sequence which they would have if they were all incorporated in a single unit. It is preferable that the fluid pressure motors be mounted at the same side of the loom as the control unit which governs their operation. Therefore, where it may be necessary to provide a control unit at each side of the loom the fluid pressure motors are preferably organized in two batteries, one at each side of the loom in association with the control unit at that side of the loom.

Each cam, by the actuation of a corresponding valve, controls the operation of a corresponding fluid pressure motor 18a. The valve organization includes for each cam a vertically positioned and axially movable valve 195, preferably of cylindrical cross section, and a valve casing structure 196 (Figure 49) having vertical bores 197 in which the valves 195 conformably fit and have their axial movements, each bore constituting a valve chamber. The valves 195 are directly operated by levers 198 connected by pivot pins 199 to lugs 200 projecting from the upper face of the valve casing 196. In the combination of elements which constitutes the invention the levers 198 are devices for moving the valves 195 between their extreme positions and for holding them in either extreme position for a predetermined period during a cycle of the operation of the loom. The bores 197 are open to the upper face of the valve casing structure 196 and the valves 195 have projecting ears 201 for their several connections by pivots 202 to the levers 198 at intermediate points thereof. The levers 198 project in overhanging relation to the control unit and at their free ends carry antifriction rollers 203 for riding engagement with the peripheral surfaces of the cams, the levers being biased by springs 204 whereby the rollers 203 will follow the contour of the cams in their revolution.

For each bore 197 the valve casing structure 196 is provided with upper and lower passages 205 and 206 extending laterally from the bores and open to atmosphere and with other upper and lower pasages 207 and 208 also extending laterally from the bores and into which are tapped fittings 209 and 210 respectively. The fittings 209 and 210 are respectively connected to hose lines 211 and 212 which are in communication with the cylinder 20a of a corresponding fluid pressure motor 18a at its respective outer and inner ends. Each valve 195 is provided with a central axially extending passage 213 open at its lower end and closed at its upper end and which communicates by upper and lower openings 214 and 215 with the respective passages 207 and 208, its communication with these passages being in alternation according to the position of the valve. In Figure 49 the valve 195 is shown as in its upper position with the opening 214 in communication with the passage 207 and the opening 215 adjacent the solid wall of the bore 197 and therefore out of communication with the opening 208. When the valve 195 is moved to its lower position indicated by the broken line V in Figure 49 the lower opening 215 is in communication with the passage 208 and the upper opening 214 is adjacent the solid wall of the bore 197 and hence is out of communication with the opening 207. Each valve 195 is also formed on its outer cylindrical face with annular upper and lower channels 216 and 217 which function in alternation as air flow passages according to the position of the valve, the channels being located suitably above and below the openings 214 and 215 respectively. When the valve is in its lower position the channel 216 establishes communication between the passages 207 and 205 and the channel 217 is in a non-functioning position adjacent the solid wall of the bore 197. When the valve 195 is in its upper position as shown the channel 217 establishes communication between the passages 208 and 206 and the channel 216 is in a non-functioning position adjacent the solid wall of the bore 197. The valve casing structure 196 has tapped into its lower side the end of an air supply pipe 218 which passes through an opening in the shelf 75a. Air delivered by the pipe 218 is supplied to the passages 213 by a series of horizontal passages 219 in the valve casing structure 196 which are in communication with the bores 197 near their lower ends and function as a manifold, the tapped end of the pipe 218 being in open communication with one of these passages.

With the valve 195 in its upper position as shown in Figure 49 air is supplied to the motor 18a to cause a movement of the piston 39a to the left, the air-flow path being from the passage 213 through the upper opening 214, passage 207 and hose line 211 to the right end of the cylinder 20a. At the same time the air in the cylinder 20a at the left of the piston 39a is vented through the hose line 212, passage 208, lower channel 217 and passage 206. With the valve 195 in its lower position air is supplied to the motor 18a to cause a movement of the piston 39a to the right, the air-flow path being from the passage 213 through the lower opening 215, passage 208 and hose line 212 to the left end of the cylinder 20a. At the same time the air in the cylinder 20a at the right of the piston 39a is vented through the hose line 211, passage 207, upper channel 216 and passage 205.

The valve casing structure 196 (Figure 48) is preferably made in sections 220, each of which is formed with four bores 197. The sections are assembled in abutting gasket sealed relation and in each instance are secured to the shelf 75a by a pair of bolt fastenings 221. The sectional construction of the valve casing structure serves the purposes of manufacturing economy and of flexibility in the assembly required in conformity to the number of cams mounted on the shaft 183. For the eight valves required in the construction shown in Figures 48 and 49 the valve casing structure is made in two sections 220 and the passages 219 at the ends of the structure are closed by removably fitted plugs 222. As an example of flexibility in assembly reference may be made to the pattern shown in Figures 29 and 29a for the weaving of which ten heddle frames are required. Hence the control unit 73a will carry ten cams and the valve casing structure 196 will be provided with ten corresponding valves. In such a case the valve casing structure will be composed of three sections 220 and the two series of passages 205, 206, 207 and 208 which are not required will be closed by removably fitted plugs in the same manner that the passages 219 at the ends of the structure are closed by the plugs 222. It will be manifest that the valve casing structure as composed of sections 220 may be readily assembled by like procedure in conformity to whatever number of cams may be mounted on the shaft 183 of the control unit.

The cams 184 to 191 conform in outline to the cams of the conventional loom and are each characterized, according to the required movements of the corresponding heddle frames, by shoulders 223U and 223D, one or more peripheral rises 224 and one or more peripheral dwells 225. The shoulders 223U and 223D have an angle of inclination between the faces 224 and 225 which is favorable to the easy actuation of the levers 198, the function of the shoulders 223U being to move the levers from the dwells 225 to the rises 224 and the function of the shoulders 223D being to permit the movements of the levers as biased by the springs 204 from the rises to the dwells. When the rollers 203 at the ends of the levers 198 travel on the rises 224 the valves 195 are in their upper positions and when they travel on the dwells the valves 195 are in their lower positions.

The six stations designations A to F are applied to Figures 52 to 59 in the same manner in which they are applied to Figures 10 to 16b. Each of the cams shown in Figures 52 to 59 corresponds functionally to a pair of companion heddle rings and is assumed to have clockwise rotation, being shown with its shoulders in the same relative positions as the contact fingers of the corresponding rings as shown in Figure 8 and indicated by check marks on the chart of Figure 26. Thus the cam 184 (Figure 52) corresponds to the two heddle rings for the number "1" heddle frame identified by the bracket "1" in Figure 8 and has two shoulders, one 223U and the other 223D which, in the operative phase assumed for Figure 51, are shown in relation to stations A and D respectively just as the contact fingers 96 of the corresponding heddle rings 94 are shown in relation to these stations in Figures 10 and 13, the rise 224 and the dwell 225 each extending through an arc of the order of 180° functionally equivalent to the spacing of the fingers 96. In like manner the cam 185 (Figure 53) corresponds functionally to the two heddle rings for the number "2" heddle frame indicated by the bracket "2" in Figure 8. Figure 52 assumes that the number "1" heddle frame has just been moved to its upper position pursuant to the raising of the lever 198 by the shoulder 223U which has just moved beyond station A; and Figure 53, viewed comparatively with Figure 52, assumes that the number "2" heddle frame has just been moved to its lower position pursuant to the lowering of the lever 198 permitted by the shoulder 223D which has just moved beyond station A. It will be noted that the positions in which the shoulders 223U and 223D of the cams 184 and 185 are shown in Figures 52 and 53 correspond to the check marks on the chart of Figure 26 indicative of the station positions of the contact fingers of the rings 94U and 94D identified in Figure 8 by the brackets "1" and "2." This correspondence of the numbers and positions of the shoulders 223U and 223D with the contact finger positions as indicated on the chart of Figure 26 also holds in respect to the cams shown in Figures 54 to 59. The cams 186 (Figure 54), 187 (Figure 55), 190 (Figure 58) and 191 (Figure 59) correspond respectively to the heddle rings 94 identified by the brackets "3," "4," "7" and "8" in Figure 8; the cam 188 (Figures 56 and 49) corresponds to the heddle rings 95 shown in Figure 16 and identified by the bracket "5"; and the cam 189 (Figure 57) corresponds to the heddle rings 95a and 95b shown in Figures 16a and 16b and identified by the bracket "6."

Referring to Figures 60 to 71:

These figures illustrate an embodiment of the invention in a structural combination of mechanical character which includes all the features above described in connection with the construction shown in Figures 48 to 59 and additional features for use in split shed weaving. For the operation of the levers 7 the loom includes the fluid pressure motors 18a as previously described, these being mounted as a battery and each including the cylinders 20a and the pistons 39a. The loom also includes a valve organization of the same structural character as that shown in Figure 49, the parts of this valve organization having the same reference numerals as the corresponding parts of the valve organization shown in Figure 49 but being distinguished by the index letter a. These parts are the valve 195a having the axial passage 213a, the upper and lower openings 214a and 215a and the upper and lower channels 216a and 217a; the valve casing structure 196a having the bore 197a which provides a chamber for the valve 195a, the upper and lower passages 205a and 206a open to atmosphere and the upper and lower passages 207a and 208a into which are tapped the respective fittings 209a and 210a; and the spring-biased valve operating lever 198a having the terminal roller 203a which tracks upon the peripheral surface of a cam of the series shown in Figures 63 to 70, the cam 226 being shown in Figure 60. The valve casing structure includes horizontal passages 219a which constitutes the manifold for delivering air, supplied by the pipe 218, to the valve chambers 197a. The valve chambers 197a are severally connected to the fluid pressure motors 18a by the hose lines 211a and 212a. The valve organization shown in Figure 60 differs from the valve organization shown in Figure 49 in that the passages 207a and 208a have a greater spacing from one another and the passages 205a and 206a are of greater diameters. Thereby each valve 195a, in addition to its upper and lower positions in which it establishes the air flow paths for the corresponding fluid pressure motor 18a, has a median position as shown in Figure 60 in which its openings 214a and 215a are located between the passages 207a and 208a and adjacent the solid wall of the bore 197a, its channel 216a is positioned to establish communication between the passages 207a and 205a and its channel 217a is positioned to establish communication between the passages 208a and 206a. Thereby the movements of the pistons 39a of the fluid pressure motors 18a in consequence of the movements of the levers 7 to their median positions as hereafter described are unopposed, the air in the cylinders 20a being vented to atmosphere through the passages 205a and 206a.

It will be noted that the valve 195a and its casing structure by virtue of the features described in the preceding paragraph constitute a valve organization which corresponds functionally to the valve organization composed of the valves 41 and 135 and the valve casing structure of the embodiment of the invention shown in Figures 31 to 47, that is to say a valve organization operable sequentially in two phases, viz. first to establish selectively either of the air flow paths for the operation of the corresponding motor 18a and second to vent air from that end of the cylinder of the motor 18a toward which the piston 39a is moving in consequence of the movements of the lever 7 to its median position whereby such movement of the lever 7 is unopposed by air in the cylinder of the associated motor 18a.

It will also be noted that the lever 198a functionally corresponds to the solenoid operated floating piston for the operation of a valve 41 of the embodiment shown in Figures 31 to 47 and the solenoids for the operation of the associated valve 135 and that, like these parts, it is a device operated by movements for effecting the operation of the valve organization associated with a motor 18a in its sequential phases as above described and that its operation as such a device is under the control of an element of the control unit, namely a cam of the group shown in Figures 63 to 70.

The loom also includes the bars 161 and 162 (Figures 47 and 61) by which the levers 7 are moved to their median positions and neutralizing fluid pressure motors 129a and 130a for their respective operation, these motors corresponding functionally to the motors 129 and 130 and being similar structurally to the motors 18a. The cams which actuate the levers 198a are of special form for operation in the shed opening and closing phases. The control unit also includes an additional cam, which may be called a neutralizing cam, for controlling the operations of the motors 129a and 130a and a valve organization of the same structural character as that shown in Figure 49 with which the neutralizing cam cooperates. Except for the provision of the neutralizing cam and those variations concerned with split shed weaving in the forms of the cams which actuate the levers 198a the control unit is structurally identical with the control unit 73a (Figure 51). In the form selected for illustration the control unit is designed for the weaving of belting of the pattern shown in Figure 25. As in the embodiment shown in Figures 48 to 59 the control unit may be designed, by selection of the various forms, number and relative positions of the cams for the weaving of any structural pattern that may be required.

For the actuation of the levers 198a the control unit includes eight cams 226, 227, 228, 229, 230, 231, 232 and 233 mounted on the shaft 183 in the order of their numerical designations and their sequences as shown in Figures 63 to 70 inclusive and having the same keyway forming groove 102a as the cams 184 to 191 (Figures 52 to 59). The cams 226 to 233 conform in outline to the cams of the conventional loom for split shed weaving of the same pattern. The six station designations A to F are applied to Figures 63 to 70 in the same manner in which they are applied in Figures 10 to 16b and 52 to 59. Each cam is assumed to have clockwise rotation and corresponds functionally to a pair of companion heddle rings and the associated pair of heddle return rings 127X and 127Y. The several peripheral working faces of the cams are arranged along three concentric circles indicated in Figures 63 to 70 by arcs in light construction lines distinguished as A1, A2 and A3. The rises 234 and dwells 235 are respectively arranged along the outer and inner circles A1 and A3. The cam median faces 236 are arranged along the intermediate circle A2 and in some instances, distinguished by the index letter X, are dwells in relation to the rises 234 and in other instances, distinguished by the index letter Y, are rises in relation to the dwells 235. The several cams include shoulders 237U and 237D which correspond functionally to the shoulders 223U and 223D of the cams shown in Figures 52 to 59 in that they effect the initial movement of the corresponding heddle frame to an extreme position opposite to the extreme position which it just previously occupied. In respect to the shoulders 237U and 237D the cams 226 to 233 in the order of their illustration in Figures 63 to 70 respectively correspond functionally to the cams 184 to 191 of the control unit for open shed weaving in the order of their illustration in Figures 52 to 59 and are shown in the same phase relations to the stations A to F. For example, the shoulders 223U of the cam 184 (Figure 52) and 237U of the cam 226 (Figure 63) are shown as having moved just beyond station A and thereby having caused the movement of the number "1" heddle frame to its upper position; and the shoulders 223D of the cam 185 (Figure 53) and 237D of the cam 227 (Figure 64) are shown as having moved just beyond station A and thereby having caused the movement of the number "2" heddle frame to its lower position. Similar comparisons in relation to station positions in the operative phase assumed may be made between the shoulders 223U and 223D of the cams shown in Figures 52 to 59 with the shoulders 237U and 237D of the functionally corresponding cams shown in Figures 63 to 70.

In functional correspondence to the heddle return rings of the control unit shown in Figure 38 the cams are formed with additional shoulders 238M and 238U between the rises 234 and the median faces 236X and 239M and 239D between the dwells 235 and the median faces 236Y. The shoulders 238M and 239M correspond functionally to the heddle return rings 127Y in that they govern the movements of the companion heddle frames from their respective up and down positions to their median positions and the shoulders 238U and 239D correspond functionally to the heddle return rings 127X in that they govern their movements from their median positions to their respective up and down positions. The working faces 234, 235, 236X and 236Y of the several cams have an extent such as to provide for the time lags H to S (Figure 46) between successive movements of the heddle frames during a cycle of loom operation.

The neutralizing cam 240 (Figures 71 and 61) is mounted at an end of the control unit, preferably in adjacency to the cam 233, and has six equally spaced rises 241 of equal extent and dwells 242 between adjacent rises and of the same extent as the rises. This cam corresponds functionally to the neutralizing rings 131 and 132 of the control element shown in Figure 8 and accordingly has twelve shoulders between the rises and the dwells, these being in two series of six, 131a and 132a respectively. The shoulders 131a of one series serve the function of the neutralizing ring 131 in that they cause the movements of the pistons of the neutralizing motors 129a and 130a on their active strokes, thereby to bring the levers 7 to their median positions. The shoulders 132a of the other series are arranged in alternation to the shoulders 131a and serve the function of the neutralizing ring 132 in that they cause the movement of the pistons of the motors 129a and 130a on their return strokes, thereby to permit the levers 7 to be moved by the fluid pressure motors 18a to their extreme positions as determined by the phase of loom operation prevailing at the time.

The neutralizing cam 240 is in cooperation with a valve organization structurally identical with that shown in Figure 49, the parts of this valve organization having the same reference numerals as the corresponding parts of the valve organization shown in Figure 49 but being distinguished by the index letter b. These parts are the valve 195b having the axial passage 213b, the upper and lower openings 214b and 215b and the upper and lower channels 216b and 217b; the valve casing structure 196b having the bore 197b which provides a chamber for the valve 195b, the upper and lower passages 205b and 216b open to atmosphere and the upper and lower passages 207b and 208b into which are tapped the respective fittings 209b and 210b; and the spring-biased valve operating lever 198b having the terminal roller 203b which tracks upon the peripheral surface of the cam 240, the lever 198b being a device for moving the valve 195b between its extreme positions and for holding it in either extreme position for a predetermined period during a cycle of the operation of the loom. The bore 197b communicates by a horizontal passage 219b with the air supply manifold constituted by the passages 219a of the valve casing structure 196a for the series of valves 195a in operative association severally with the cams 226 to 233. A hose line 243 extends between the fitting 209b and the inner end of the cylinder of the fluid pressure motor 129a, and has a branch 244 which extends to the outer end of the cylinder of the fluid pressure motor 130a. A hose line 245 extends between the fitting 210b and the outer end of the cylinder of the motor 129a and has a branch 246 which extends to the inner end of the motor 130a. The valve casing structures 196b and 196a are attached in adjoining relation to the shelf 75a by bolt fastenings 221.

When the valve 195b is in either of its upper or lower positions all of the valves 195a are in their median positions as shown in Figure 60. With the valve 195b in its upper position as shown in Figure 61 air is delivered by the hose line 243 to the inner end of the cylinder of the motor 129a and by the branch 244 to the outer end of the cylinder of the motor 130a, thereby to move the pistons of the motors 129a and 130a on their active strokes, that is to say to the right and left respectively (Figure 61 being considered). These piston movements cause the bars 161 and 162 to be moved toward one another whereby the levers 7 are moved to their median positions with the result that the heddle frames are moved to their median positions. This movement of the levers 7 to their median positions is permitted because the movements of the pistons 39a of the fluid pressure motors 18a are unopposed, the air within the cylinders 20a being vented through the passages 205a and 206a as above explained. During these movements of the pistons of the motors 129a and 130a air is vented from the cylinder spaces at the right side of the piston of the motor 129a through the hose line 245 and at the left side of the piston of the motor 130a through the branch 246, the vented air escaping to atmosphere through the passage 206b. When the valve 195b is in its lower position the air flow paths are reversed. In such reversal air is delivered to the outer and inner ends of the cylinders of the motors 129a and 130a respectively, thereby to move the pistons of the motors 129a and 130a on their return strokes, that is to say to the left and right respectively. These piston movements cause the bars 161 and 162 to be moved away from one another whereby the levers 7 may be moved by their corresponding fluid pressure motors 18a to their extreme positions with the result that the heddle frames are moved to their extreme positions as determined by the prevailing phase of loom operation. During the return movements of the pistons of the motors 129a and 130a air is vented from the cylinder space at the left side of the piston of the motor 129a through the hose line 243 and from the cylinder space at the right side of the piston of the motor 130a through the branch 244, the vented air escaping to atmosphere through the passage 205b.

From the description in the preceding paragraph it will be noted that the valve 195b prescribes the coordinated movements of the pistons of the motors 129a and 130a and hence is the functional equivalent of the valves 41a which prescribe the coordinated movements of the pistons of the motors 129 and 130. In this functional equivalency the valve 195b, like the valves 41a, is a valve means operable to establish contemporaneous air flow paths for the admission of air to one end of each of the cylinders of the motors 129a and 130a and the exhaust of air from its opposite end and has two phases of operation in which the air flow paths of the two cylinders are simultaneously reversed.

It will be noted that the lever 198b functionally corresponds to the solenoid operated floating pistons for the operation of the valves 41a and that, like these pistons, it is a movably mounted actuating means for effecting the operation of the valve means associated with the motors 129 and 130a in its sequential phases as above described and that its operation, as such an actuating means, is under the control of the cam 240.

The manner in which the cams of the series 226 to 233 cause the movements of the heddle frames will be sufficiently clear by a description limited to the cam 226 as a convenient example and to the movements of the number "1" heddle frame as they are illustrated by the diagram of Figure 46. In Figure 60 the cam 226 which controls the movements of the number "2" heddle frame is shown in a position different from the position in which it is shown in Figure 63. Thus in Figure 60 the shoulder 236M which immediately follows the shoulder 237U has passed beyond the roller 203a whereby the lever 198a has been moved to its median position with its roller 203a tracking upon the succeeding median cam surface 236X. In this position of the cam 226 the number "1" heddle frame has moved from its upper position to its median position and has completed its first reciprocation in a cycle of loom operation, the heddle frame being at rest in its median position during the time lag I. This is followed by the engagement of the succeeding shoulder 236U with the roller 203a whereby the lever 198a is again moved to its upper position in which the roller 203a tracks upon the succeeding rise 234. When the cam in its clockwise rotation has reached a position in which the roller 203a tracks upon the median cam surface 236X immediately ahead of the shoulder 237D the heddle frame will have completed the three reciprocations between its median and upper positions which constitute the first half of the cycle of loom operation and will be at rest in its median position during the time lag M. At the completion of the time lag M the shoulder 237D will pass beyond the roller 203a and the lever 198a will move to its lower position in which the roller 203a tracks upon the dwell 235 immediately following the shoulder 237D. Thereupon the number "1" heddle frame will commence the second half of the cycle of loom operation by a movement to its lower position in which it remains at rest during the time lag M. Upon the expiration of the time lag M the shoulder 239M will raise the lever 198a to its median position in which the roller 203a tracks upon the succeeding median cam surface 236Y. Thereupon the number "1" heddle frame will be moved back to its median position, and will have completed its first reciprocation in the second half of the cycle of loom operation at which time it will be at rest during the time lag O. This will be followed by the passage of the succeeding shoulder 239D beyond the roller 203a whereupon the lever 198a will again move to its lower position in which the roller 203a tracks upon the succeeding dwell 235. When the cam in its clockwise rotation again reaches the position in which the shoulder 237U engages the lever 198a to move it to its upper position the heddle frame will have completed the three reciprocations between its median and lower positions which constitute the second half of the cycle of loom operation and, the time lag S having expired, will again be moved to its upper position in commencement of the succeeding cycle of loom operation.

The cam 227 for the operation of the number "2" heddle frame is identical in form with the cam 226 but is positioned on the shaft 183 of the control unit at an angle of 180° relatively to the position of the cam 226. Thereby during the first half cycle of loom operation in which the cam 226 by its shoulder 237U, rises 234, shoulders 238M, dwells 236X and shoulders 238U is effecting the three reciprocations of the number "1" heddle frame between its median and upper positions (the first half of the cycle of loom operation) as above explained, the cam 227 by its shoulder 237D, dwells 235, shoulders 239M, rises 236U and shoulders 239D is contemporaneously effecting the three reciprocations of the number "2" heddle frame between its median and lower positions (as above explained in connection with the cam 226 and the number "1" heddle frame) which are indicated in the chart of Figure 46 by broken lines. At the conclusion of the time lag M the cams 226 and 227 contemporaneously and respectively effect the three reciprocations of the number "1" and "2" heddle frames between their median and respective lower and upper positions, thereby completing the second half of the cycle of loom operation which, as shown by the diagram of Figure 46, includes the time lags N to S.

The several cams of the series 226 to 233 operate during the time lags to cause the movements of the corresponding valves 195a to their median or by-passing positions. This is a conditioning operation which corresponds to the movement of the valves 135 to their by-passing positions as shown in Figure 35, and, as above explained, makes possible the operation of the pistons of the motors 129a and 130a on their active strokes (Figure 61) by venting the air in the cylinders 20a of the fluid pressure motors 18a substantially contemporaneously with the movement of the valve 195b to its upper position. The conditioning operation in connection with the movements of the levers 7 by the fluid pressure motors 18a to their extreme positions involves the movement of the pistons of the motors 129a and 130a on their return strokes, thereby to move the bars 161 and 162 away from one another. In this operation the valve 195b is moved to its lower position substantially contemporaneously with the movement of the several valves 195a to their upper or lower positions, according to the phase of loom operation prevailing at the time.

It will, of course, be apparent that in the embodiment shown in Figures 31 to 47 a mechanically operated valve construction and its associated cam as shown in Figure 61 may be substituted for the electrically operated valve organization under the control of the neutralizing rings 131 and 132 for effecting the operations of the motors 129 and 130; and that in the embodiment shown in Figures 60 to 71 an electrically operated valve organization under the control of the neutralizing rings 131 and 132 may be substituted for the mechanically operated valve construction and its associated cam as shown in Figure 61.

In the construction shown and described and, as preferred, the control unit, similarly to the cam shaft of the standard loom, has one revolution for each cycle of loom operation. It will be apparent, however, that the gearing by which the control unit is driven may be set up whereby a revolution of the control unit, within practical limits, may correspond to more than one cycle of loom operation. Assuming, for example, that it be desired that a revolution of the control unit correspond to two cycles of loom operation the number of controlling parts on the several elements of the control unit and the number of stations in a revolution of the control unit will be doubled in connection with appropriate spacing of the parts of the elements of the control unit. Concretely, taking the 94U and 94D heddle rings for the number "1" heddle frame, as an example, each will be provided with two contact fingers located at diametrically opposite points and the relative spacing of the contact fingers will be at intervals of ninety degrees. It is believed that this colorable variation will be manifest from the foregoing description, and illustration thereof is therefore deemed unnecessary.

I claim:

1. In a loom having a supporting frame, a power driven shaft and a series of heddle frames: a mechanism for controlling the operation of the heddle frames comprising, in combination, a series of fluid pressure motors mounted as a battery adjacent the supporting frame, one motor being provided for each heddle frame for effecting its operation and each motor having as companion parts a cylinder and a piston, one of the companion parts being reciprocatory; means of operative connection severally between the reciprocatory motor parts and the corresponding heddle frames; a valve organization in functional association with each fluid pressure motor and including a valve casing and a valve mounted for movement between two extreme positions, the valve casing being connected to a source of air supply and having passages by which it communicates with the cylinder of the corresponding fluid pressure motor at the opposite ends thereof and also having vent passages for communication with said cylinder at the opposite ends thereof, the valve having passages for cooperation with the passages in the valve casing and in its extreme positions establishing contemporaneous air flow paths for the admission of air to one end of the cylinder and the exhaust of air from the opposite end of the cylinder, the valve in either of its extreme positions effecting a reversal of the air flow paths as established in its other extreme position whereby air is admitted in alternation to opposite ends of the cylinder and is contemporaneously vented from the end of the cylinder opposite to the end to which air is admitted; a series of devices, one for each valve, movable between two extreme positions and operable to effect the movements of the valves between their extreme positions and severally to hold them in either of the extreme positions for predetermined periods during a cycle of operation of the loom; a rotatable control unit mounted adjacent the supporting frame; the control unit including a driven shaft and a series of elements mounted thereon, the elements being fixedly connected to the shaft for rotation therewith in a circular orbit and having parts formed and arranged in accordance with the determined pattern of weave and operable at a fixed point in the orbit of the control unit for effecting the operations severally of said devices in respect to their movements between, and the duration of their retention in, their extreme positions during a cycle of operation of the loom; gearing mounted adjacent the supporting frame and operative from the power driven shaft of the loom for driving the shaft of the control unit; and supporting bearings for the shaft of the control unit constructed to permit the control unit to be moved from its operating position and another control unit having elements of different form and arrangement to be substituted in operatively connected relation to the gearing.

2. A mechanism for controlling the operation of heddle frames as set forth in claim 1 wherein the means of operative connection between the reciprocatory motor parts and the corresponding heddle frames comprise a series of levers, one for each heddle frame, at one side of the loom, the levers being pivotally mounted coaxially midway between their ends for movement severally in vertical planes and constituting parts of the harness, each lever being operatively connected at its upper and lower ends to the corresponding heddle frame and being operatively connected near one end to the reciprocatory motor part.

3. A mechanism for controlling the operation of heddle frames as set forth in claim 1 wherein the means of operative connection between the reciprocatory motor parts and the corresponding heddle frames comprise a series of levers, one for each heddle frame, at one side of the loom, the levers being pivotally mounted coaxially midway between their ends for movement severally in vertical planes and constituting parts of the harness, each lever being operatively connected at its upper and lower ends to the upper and lower bars of the corresponding heddle frame and being operatively connected near one end to the reciprocatory motor part, and wherein two series of motion stops are provided in opposed relation for engagement respectively by the inner and outer edge faces of the levers, the motion stops being individually adjustable horizontally and serving severally to determine the extent of the strokes of the corresponding levers and severally to determine the extreme positions of the levers relatively to a vertical center line taken through the pivots of the levers.

4. A mechanism for controlling the operation of heddle frames as set forth in claim 1 wherein the means of operative connection between the reciprocatory motor parts and the corresponding heddle frames comprise a series of levers, one for each heddle frame, at one side of the loom, the levers being pivotally mounted coaxially midway between their ends for movement severally in vertical planes and constituting parts of the harness, each lever being operatively connected at its upper and lower ends to the upper and lower bars of the corresponding heddle frame and being operatively connected near one end to the reciprocatory motor part, and wherein two series of horizontal screws functioning as motion stops are provided in opposed relation with the several screws of each series in alinement with the corresponding screw of the other series, the screws of one series being engaged by the inner edge faces of the levers and th screws of the other series being engaged by the outer edge faces of the levers, the screws being adjustable relatively to one another severally to determine the extent of the strokes of the corresponding levers and severally to determine the extreme positions of the levers relatively to a vertical center line taken through the pivots of the levers.

5. A mechanism for controlling the operation of heddle frames as set forth in claim 1 wherein the supporting frame of the loom carries a cage removably mounted at one side thereof and provided with a series of horizontal shelves, one above the other, and the fluid pressure motors are arranged horizontally in tiers and are supported upon the several shelves.

6. A mechanism for controlling the operation of heddle frames as set forth in claim 1 wherein the loom drive shaft is provided with a hand wheel for initially setting the parts of the loom at the beginning of its operation, and the gearing is speed reducing and includes a shaft positioned coaxially with the loom drive shaft and having a square terminal portion and a plate having a square opening in which said terminal portion fits, the plate being detachably connected to the hand wheel.

7. A mechanism for controlling the operation of heddle frames as set forth in claim 1 wherein the loom drive shaft is provided with the usual hand wheel for initially setting the parts of the loom at the beginning of its operation, the gearing is speed reducing and includes a shaft positioned coaxially with the loom drive shaft and having a square terminal portion, a plate having a square opening in which said terminal portion fits, the plate being detachably connected to the hand wheel, and the gearing includes another shaft detachably connected as a drive element to the shaft of the control unit.

8. A mechanism for controlling the operation of heddle frames as set forth in claim 1 wherein the elements carried by the control unit for the operation of the devices are removably mounted on the shaft of the control unit and spacers are arranged between adjacent elements.

9. A mechanism for controlling the operation of heddle frames as set forth in claim 1 wherein the elements carried by the control unit are removably mounted upon the shaft of the control unit, spacers are arranged between adjacent elements, the parts for the operations severally of said devices are located variously and selectively with reference to equidistant fixed points in the orbit of the elements, the fixed points corresponding in number to the number of weft threads laid in a cycle of loom operation, and the elements are formed to provide a common point of reference for the location of said parts in effecting the assembly of the control unit in relation to the equidistant fixed points.

10. A mechanism for controlling the operation of heddle frames as set forth in claim 1 wherein the elements carried by the control unit are removably mounted upon the shaft of the control unit, spacers are arranged between adjacent elements, each element is formed with a groove, the grooves of the series of elements providing a keyway, and the shaft has a longitudinal key for engagement in the keyway, the keyway constituting a point of reference for the selective location in effecting the assembly of the control unit of the parts for the several operations of said devices variously with reference to equidistant fixed points in the orbit of the elements, the fixed points corresponding in number to the number of weft threads laid in a cycle of loom operation.

11. A mechanism for controlling the operation of heddle frames as set forth in claim 1 wherein a pair of separate electrical means effective by energization is provided for the respective actuations of each of the devices which effect the movements of the valves, one electrical means actuating the device in one direction and the other actuating it in the opposite direction, the electrical means being contemporaneously energized and deenergized in alternate relation; the elements mounted on the shaft of the control unit are in the form of pairs of companion contact rings and the parts of the elements for the operation of said devices are contact fingers projecting from the rings; the control unit includes a line ring and a sleeve upon which the contact rings and the line ring are mounted, the sleeve functioning as a bus bar for supplying current delivered by the line ring to the contact rings; the contact rings as paired companions are heddle rings and function in respect to the control of the operations of a corresponding heddle frame; a stationary contact is in continuous engagement with the line ring and delivers current from a source of supply; and stationary contacts are provided for engagement by the contact fingers at a fixed point in the orbit of the control unit, the stationary contacts for the contact rings of a companion pair being in electrical circuits which includes the respective electrical means of the corresponding pair whereby the engagement of a contact finger of one contact ring of a companion pair with its associated stationary contact will energize one of the electrical means of a corresponding pair and the engagement of a finger of the other companion ring with its associated stationary contact will energize the other electrical means of the pair.

12. A mechanism for controlling the operation of the heddle frames as set forth in claim 11 wherein the contact rings and the line ring in adjacent relation are separated by annular blocks of insulating material; the line ring and the contact fingers of the contact rings are flush with the peripheral surfaces of the blocks; and the stationary contacts are leaf springs which straddle adjacent blocks and bear with pressure upon their peripheral surfaces.

13. A mechanism for controlling the operation of heddle frames as set forth in claim 1 wherein the valves have parts which project beyond the valve casing, the devices for effecting the movements of the valves consist of levers mounted on fixed pivots and pivoted between their ends to the projecting parts of the valves, and the elements of the control units for the operation of the levers consist of cams mounted upon the shaft of the control unit and formed with rises, dwells and shoulders extending angularly between the rises and the dwells, the free ends of the levers tracking severally upon the cams whereby in the rotation of the cams certain of the shoulders are operative at a fixed point in the orbit of the control unit to cause the movement of the levers from the dwells to the rises and others of the shoulders are operative at the same fixed point to cause the movement of the levers from the rises to the dwells, the levers in these movements severally causing the movements of the valves between their extreme positions.

14. A mechanism for controlling the operation of heddle frames as set forth in claim 1 wherein the parts of the control unit operable for effecting the operation severally of said devices are located variously and selectively with reference to equidistant fixed points in the orbit of the control unit, the fixed points corresponding in number to the number of weft threads laid in a cycle of loom operation and wherein the mechanism includes additional means to provide for a weaving operation of the split shed type, the additional means being characterized by two additional fluid pressure motors, each having a reciprocatory part; valve means operable sequentially in either of two phases to establish contemporaneous air flow paths for the admission of air to one end of each of the cylinders of the additional fluid pressure motors and the exhaust of air from its opposite end and operative to provide for the admission of air simultaneously to the opposite ends of the respective cylinders of the additional fluid pressure motors, the valve means in either of its phases effecting the reversal of the air flow paths as established in its other phase whereby air is admitted in alternation to the opposite ends of each cylinder of the additional fluid pressure motors and is contemporaneously vented from the end of the cylinder opposite to the end to which air is admitted; a cross bar connected to the reciprocatory part of each additional fluid pressure motor, the cross bars being in opposed relation and extending across the means of operative connection; the reciprocatory parts of the additional fluid pressure motors being simultaneously movable in opposite directions whereby the cross bars have active strokes in which they are movable toward one another and return strokes in which they are movable away from one another, the cross bars on their active strokes by engagement with the means of operative connection effecting the movements of the heddle frames to their median positions and on their return strokes permitting the movements of the heddle frames to the extreme positions which accord with the phase of loom operation prevailing at the time; each valve organization being operable sequentially in two phases in one of which it establishes selectively either of the air flow paths for the operation of the corresponding fluid pressure motor and in the other of which it vents air from that end of the cylinder of the corresponding fluid pressure motor toward which its piston is being moved in consequence of the movement of a corresponding means of operative connection by one of the cross bars in its active stroke, thereby to eliminate opposition to such movement of the piston; a device for the operation of the valve organization in either of its phases and movable for effecting such operation; the elements mounted on the shaft of the control unit in each instance including additional parts for the actuation of said last named device as provided for a corresponding valve organization, the additional parts being sequentially operative at the said fixed point in the orbit of the control unit in correspondence to each beat of the lay for the laying of a weft thread to establish reversed air flow paths for the operation of the corresponding fluid pressure motor of the battery and for the venting of air from its cylinder; actuating means having sequential movements and in operative association with the valve means for effecting its respective operation in its two phases; and an additional element mounted on the shaft of the control unit and operative at the said fixed point in the orbit of the control unit in correspondence to each beat of the lay for effecting the sequential operative movements of the actuating means.

15. A mechanism for controlling the operation of heddle frames as set forth in claim 11 wherein each valve organization in functional association with a fluid pressure motor of the battery in addition to the named valve includes a second valve in cooperation with the valve casing and having two positions, in one of which it cooperates with the named valve to complete the air flow paths for the operation of the motor and in the other of which it cuts off the supply of air to the motor and provides for the venting of air from one to the other end of the cylinder of the motor; a second pair of separate electrical means effective by energization is provided for effecting the actuation of the second valve, one electrical means of the second pair causing the movement of the second valve to one position and the other electrical means of the second pair causing the movement of the second valve to its other position; the elements mounted on the shaft of the control unit in each instance including the heddle rings as paired companions for governing the operations of the named valve and a second pair of companion contact rings for governing the operations of the second valve, the several rings having projecting contact fingers; the valve means for the two additional fluid pressure motors includes for each motor a valve casing and a valve mounted for movement between two extreme positions, the valve casing being connected to a source of air supply and having passages by which it communicates with the cylinder of the corresponding additional fluid pressure motor at the opposite ends thereof and also having vent passages for communication with said cylinder at the opposite ends thereof, the valve having passages for cooperation with the passages in the valve casing and in its extreme positions establishing contemporaneous air flow paths for the admission of air to one end of the cylinder and the exhaust of air from the opposite end of the cylinder, the valve in either of its extreme positions effecting the reversal of the air flow paths as established in its other extreme position; the movably mounted actuating means for the valve means includes a movable part in association with each valve of the valve means; two pairs of separate electrical means effective by energization are provided for effecting the movements of the respective parts of the actuating means; an additional element is mounted on the shaft of the control unit for controlling the operations of the two pairs of electrical means for the parts of the actuating means, the additional element consisting of a pair of companion contact rings having projecting contact fingers; a line ring is mounted upon the control unit; a sleeve is provided upon which the contact rings and the line ring are mounted, the sleeve functioning as a bus bar for supplying current delivered by the line ring to the contact ring; a stationary contact is in continuous engagement with the line ring and delivers current from a source of supply; and stationary contacts are provided for engagement by the contact fingers of the contact rings at a fixed point in the orbit of the control unit, the stationary contacts being in electrical circuits severally for the electrical means of each pair; the companion contact rings of a pair for governing the operations of the second valve of a corresponding valve organization being heddle return rings and having their contact fingers in mutually offset relation and provided in equally spaced relation in a number which corresponds to the number of weft threads laid in a cycle of loom operation, one contact ring of each pair by the contact engagements of its fingers controlling the movements of the second valve to one of its positions and the other contact ring of each pair by contact engagements of its fingers in sequential relation to the contact engagements of the fingers of the companion ring controlling the movements of the second valve to its other position; the companion contact rings of the additional element being neutralizing rings and also having their contact fingers in mutually offset relation and provided in equally spaced relation in a number which corresponds to the number of weft threads laid in a cycle of loom operation, one contact ring of the additional element having the contact engagements of its fingers synchronized with the contact engagements of the fingers of the rings which control the movements of the second valves to one of their positions and controlling one of the operations of the two additional fluid pressure motors and the other contact ring of the additional element having the contact engagements of its fingers synchronized with the contact engagements of the fingers of the rings which control the movements of the second valves to the other of their positions and controlling the other operation of the two additional fluid pressure motors.

16. A mechanism for controlling the operation of heddle frames as set forth in claim 14 wherein each valve organization in functional association with a fluid pressure motor of the battery includes a valve and a valve casing in communication with a source of air supply, the valve casing having two passages in communication respectively with the opposite ends of the cylinder of the fluid pressure motor and also having two vent passages in respective alinement with the passages first named; the valve casing being formed to provide a chamber for the valve, and the valve being slidably mounted in its chamber and having a recess open to the chamber and to which air is supplied from the source, openings extending from the recess for communication with the respective passages first named, and external channels for establishing communication between the respective passages first named and the corresponding vent passages; the valve having opposite extreme positions and a median position, the valve in one extreme position establishing an airflow path which includes one of its openings and one of the first named passages for the flow of air to one end of the cylinder of the fluid pressure motor and another path including one of its channels, the other of the first named passages and a vent passage for the flow of air from the opposite end of the cylinder of the fluid pressure motor, and in its opposite extreme position reversing the airflow paths, the valve in its median position establishing communication by means of its channels between both of the passages first named and the respective alining vent passages; each valve has a part which projects beyond the valve casing; the devices for effecting the movements of the valves consist of levers mounted on fixed pivots and pivoted between their ends to the projecting parts of the valves, the levers having three positions corresponding to the three positions of the valves; the elements of the control units for the operation of the levers consist of cams mounted upon the shaft of the control unit and formed with rises, dwells and the intermediate working faces, these being respectively located along the arcs of three concentric circles, the cams also being formed with shoulders extending angularly between the intermediate working faces and the rises and between the intermediate working faces and the dwells whereby certain of the intermediate working faces are dwells in relation to the rises and others are rises in relation to the dwells; the free ends of the levers tracking severally upon the cams; the shoulders which extend between the intermediate working faces and the rises effecting reciprocations of the levers between one extreme position and the median position and the shoulders which extend between the intermediate working faces and the dwells effecting reciprocations of the levers between the opposite extreme position and the median position; the valve means for the additional fluid pressure motors consists of a valve and a valve casing in communication with the source of air supply, the valve casing having two passages, each in communication respectively with the opposite ends of the cylinders of the additional fluid pressure motors and each passage being in simultaneous communication with one end of the cylinder of one of the additional fluid pressure motors and with the opposite end of the cylinder of the other additional fluid pressure motor, the valve casing also having two vent passages in respective alinement with its two first named passages; the valve casing being formed to provide a chamber for the valve of said valve means; and the valve of said valve means being slidably mounted in the chamber and having a recess open to the chamber and to which air is supplied from the source, openings extending from the recess for communication with the respective passages first named and external channels for establishing communication between the passages first named and the respective alining vent passages, the valve having two positions in one of which one of its openings is in communication with one of the passages first named and one of its channels establishes communication between the other passage first named and the alining vent passage and in the other of which the paths of communication are reversed; the valve of the valve means having a part which projects beyond its valve casing; the actuating means for the valve means consists of a lever mounted on a fixed pivot and pivoted between its ends to the projecting part of the valve, the lever having two positions corresponding to the two positions of the valve; and the additional element mounted on the shaft of the control unit for effecting the sequential operative movements of the actuating means consists of a cam having equally spaced co-extensive rises, equally spaced dwells coextensive with the rises and shoulders extending between the rises and the dwells; the lever constituting the actuating means having a free end which tracks upon the cam constituting the additional element.

References Cited in the file of this patent

UNITED STATES PATENTS

| Number | Name | Date |
|---|---|---|
| 2,377,800 | Mascarenhas | June 5, 1945 |
| 2,425,676 | Hindle | Aug. 12, 1947 |
| 2,558,284 | Whitaker | June 26, 1951 |
| 2,609,840 | Murphy | Sept. 9, 1952 |